United States Patent
Ito et al.

(10) Patent No.: US 11,322,769 B2
(45) Date of Patent: May 3, 2022

(54) FLOW BATTERY

(71) Applicant: Panasonic Intellectual Property Management Co., Ltd., Osaka (JP)

(72) Inventors: Shuji Ito, Nara (JP); Masahisa Fujimoto, Osaka (JP); Honami Sako, Osaka (JP); Sho Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/931,325

(22) Filed: Jul. 16, 2020

(65) Prior Publication Data

US 2020/0350608 A1 Nov. 5, 2020

Related U.S. Application Data

(63) Continuation of application No. PCT/JP2019/018855, filed on May 13, 2019.

(30) Foreign Application Priority Data

May 30, 2018 (JP) .............................. JP2018-103961
May 30, 2018 (JP) .............................. JP2018-103962

(Continued)

(51) Int. Cl.
*H01M 8/18* (2006.01)
*H01M 4/40* (2006.01)
*H01M 10/38* (2006.01)

(52) U.S. Cl.
CPC .............. *H01M 8/18* (2013.01); *H01M 4/40* (2013.01); *H01M 10/38* (2013.01)

(58) Field of Classification Search
CPC ........... H01M 8/18; H01M 2300/0028; H01M 8/188; H01M 8/20; H01M 10/38;

(Continued)

(56) References Cited

U.S. PATENT DOCUMENTS 5,498,492 A * 3/1996 Hara .................... H01M 10/05
429/337
2012/0135278 A1* 5/2012 Yoshie ................... H01M 8/20
429/7

(Continued)

FOREIGN PATENT DOCUMENTS

JP 5417441 2/2014
JP 2016-085955 5/2016

(Continued)

OTHER PUBLICATIONS

International Search Report of PCT application No. PCT/JP2019/018855 dated Jul. 16, 2019.

*Primary Examiner* — Alexander Usyatinsky

(74) *Attorney, Agent, or Firm* — McDermott Will & Emery LLP

(57) ABSTRACT

In a flow battery according to one aspect of the present disclosure, a first liquid does not include an undesired compound. The flow battery satisfies requirement (i), (ii), (iii) or (iv). (i) An anode active material 14 includes graphite, and the first liquid has an equilibrium potential of not more than 0.15 V vs. Li/Li$^+$. (ii) An anode active material includes aluminum, and the first liquid has an equilibrium potential of not more than 0.18 V vs. Li/Li$^+$. (iii) An anode active material includes tin, and the first liquid has an equilibrium potential of not more than 0.25 V vs. Li/Li$^+$. (iv) An anode active material includes silicon, and the first liquid has an equilibrium potential of not more than 0.25 V vs. Li/Li$^+$.

5 Claims, 11 Drawing Sheets

(30) Foreign Application Priority Data

May 30, 2018 (JP) .............................. JP2018-103967
Apr. 25, 2019 (JP) .............................. JP2019-083556

(58) Field of Classification Search
CPC ............... H01M 4/40; H01M 10/0569; H01M 10/4214; H01M 4/386; H01M 4/387; H01M 4/463; H01M 4/587; H01M 4/38; Y02E 60/50; Y02E 60/10; Y02P 70/50
See application file for complete search history.

(56) References Cited

U.S. PATENT DOCUMENTS

| | | | |
|---|---|---|---|
| 2015/0255803 A1* | 9/2015 | Delnick | H01M 4/9041 429/498 |
| 2015/0333353 A1 | 11/2015 | Yazami et al. | |
| 2016/0126582 A1* | 5/2016 | Xiao | H01M 4/58 429/126 |
| 2018/0026293 A1 | 1/2018 | Fujimoto et al. | |
| 2018/0048004 A1 | 2/2018 | Hojo | |
| 2019/0058208 A1 | 2/2019 | Fujimoto et al. | |

FOREIGN PATENT DOCUMENTS

| | | |
|---|---|---|
| JP | 2018-018816 | 2/2018 |
| WO | 2016/208123 | 12/2016 |
| WO | 2018/016249 | 1/2018 |

\* cited by examiner

FLOW BATTERY

BACKGROUND

1. Technical Field

The present disclosure relates to a flow battery.

2. Description of the Related Art

In a flow battery, a liquid in contact with an active material or a liquid in which the active material has been dissolved flows, and charge/discharge is performed by electrochemically oxidizing/reducing the active material. A battery capacity of the flow battery is determined depending on an amount of the active material. For this reason, size of the flow battery can be easily increased by increasing the amount of the active material in the flow battery.

Patent Literatures 1 to 6 disclose an example of a flow battery.

CITATION LIST

Patent Literature

Patent Literature 1: United States Patent Application Publication No. 2015/0333353
Patent Literature 2: Japanese Patent Publication No. 5417441
Patent Literature 3: International Publication 2016/208123
Patent Literature 4: United States Patent Application Publication No. 2015/0255803
Patent Literature 5: Japanese Patent Application Publication No.: 2018-18816
Patent Literature 6: International Publication 2018/016249

SUMMARY

In the prior art, it is desired to realize a flow battery having a simple configuration and a high energy density.

The flow battery according to one aspect of the present disclosure comprises:
an anode;
a cathode;
a first liquid which includes an anode mediator and lithium ions and is in contact with the anode;
an anode active material which is in contact with the first liquid;
a second liquid which is in contact with the cathode; and
a lithium ion conductive film disposed between the first liquid and the second liquid,
wherein
the first liquid does not include an undesired compound;
the following requirement (i), (ii), (iii) or (iv) is satisfied;
(i) the anode active material includes graphite, and the first liquid has an equilibrium potential of not more than 0.15 V vs. $Li/Li^+$ when a potential measurement test A is performed;
(ii) the anode active material includes aluminum, and the first liquid has an equilibrium potential of not more than 0.18 V vs. $Li/Li^+$ when the potential measurement test A is performed;
(iii) the anode active material includes tin, and the first liquid has an equilibrium potential of not more than 0.25 V vs. $Li/Li^+$ when the potential measurement test A is performed;
(iv) the anode active material includes silicon, and the first liquid has an equilibrium potential of not more than 0.25 V vs. $Li/Li^+$ when the potential measurement test A is performed;
where
the potential measurement test A is performed by the following method comprising dissolving a lithium metal in the first liquid to saturate the first liquid with lithium, measuring a potential of the first liquid, and regarding a provided measured value as the equilibrium potential of the first liquid;
the undesired compound is an organic compound having an equilibrium potential of not less than 0.3 V vs. $Li/Li^+$ when a potential measurement test B is performed;
where
the potential measurement test B is performed by the following method comprising preparing a 2-methyltetrahydrofuran solution including the organic compound at a concentration of 0.1 mol/L, dissolving a lithium metal in the 2-methyltetrahydrofuran solution to saturate the 2-methyltetrahydrofuran solution with lithium, measuring a potential of the 2-methyltetrahydrofuran solution, and regarding a provided measured value as the equilibrium potential of the organic compound.

According to the present disclosure, a flow battery having a simple configuration and a high energy density can be provided.

DETAILED DESCRIPTION OF THE EMBODIMENT

Hereinafter, an embodiment of the present disclosure will be described with reference to the drawings. The present disclosure is not limited to the following embodiment.

Figure 1:
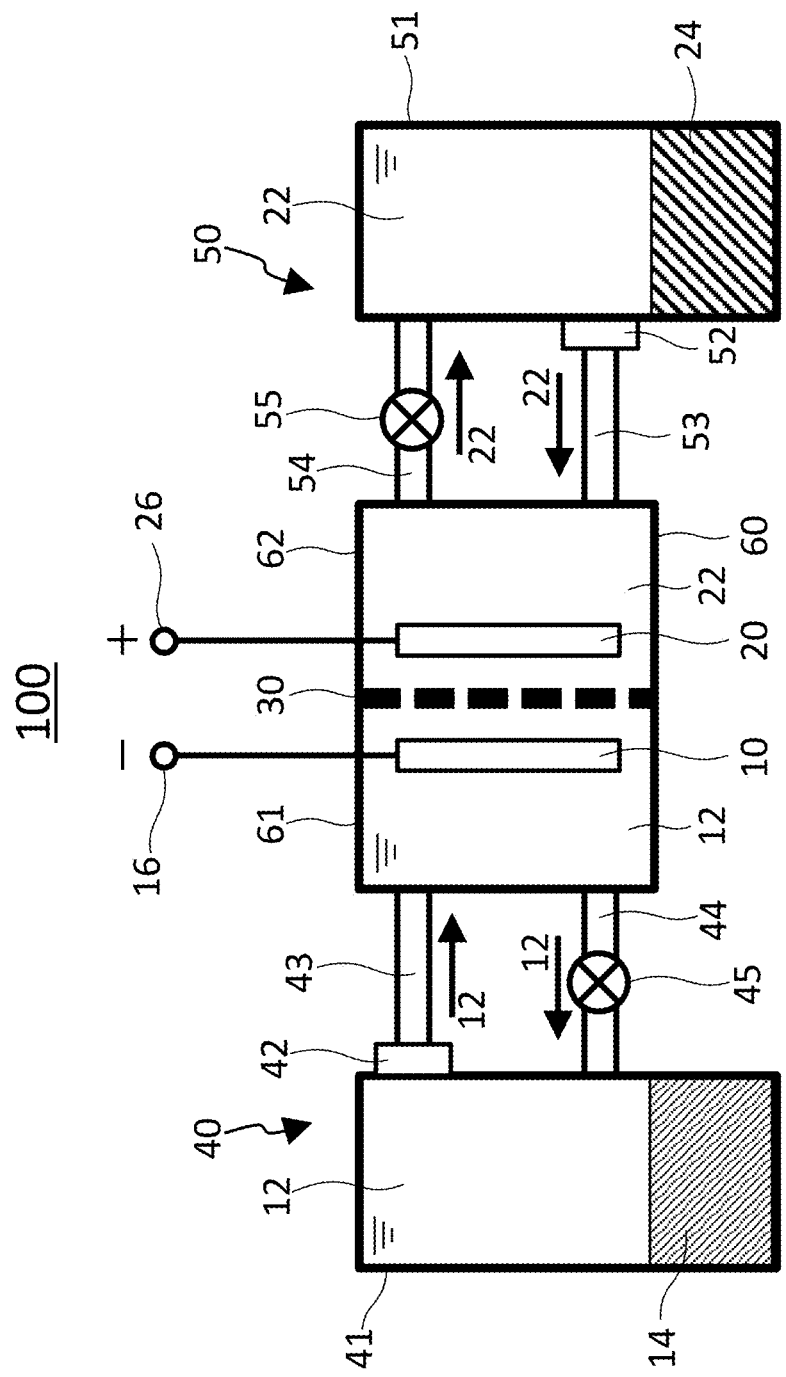
FIG. 1 is a schematic diagram showing a schematic configuration of a flow battery according to the present embodiment.

FIG. 1 is a schematic diagram showing a schematic configuration of a flow battery 100 according to the present embodiment. As shown in FIG. 1, the flow battery 100 comprises an anode 10, a cathode 20, a first liquid 12, a second liquid 22, an anode active material 14, and a lithium ion conductive film 30. The first liquid 12 includes a solvent, an anode mediator, and lithium ions. The first liquid 12 is in contact with the anode 10 and the anode active material 14. In other words, the anode 10 and the anode active material 14 are immersed in the first liquid 12. The second liquid 22 includes a solvent and lithium ions. The second liquid 22 is in contact with the cathode 20. In other words, the cathode 20 is immersed in the second liquid 22. The lithium ion conductive film 30 is disposed between the first liquid 12 and the second liquid 22 and separates the first liquid 12 and the second liquid 22 from each other. The lithium ion conductive film 30 has lithium ionic conductivity.

In the flow battery 100, the following requirement (i), (ii), (iii) or (iv) is satisfied.

(i) The anode active material 14 includes graphite, and the first liquid 12 has an equilibrium potential of not more than 0.15 V vs. Li/Li$^+$ when a potential measurement test A is performed.

(ii) The anode active material 14 includes aluminum, and the first liquid 12 has an equilibrium potential of not more than 0.18 V vs. Li/Li$^+$ when the potential measurement test A is performed.

(iii) The anode active material 14 includes tin, and the first liquid 12 has an equilibrium potential of not more than 0.25 V vs. Li/Li$^+$ when the potential measurement test A is performed.

(iv) The anode active material 14 includes silicon, and the first liquid 12 has an equilibrium potential of not more than 0.25 V vs. Li/Li$^+$ when the potential measurement test A is performed.

The potential measurement test A is performed, for example, by the following method. First, 2×2 cm copper foil is wrapped with a polypropylene microporous separator. Next, the entire separator is wrapped with a large amount of lithium metal foil. Next, tabs are attached to the copper foil and the lithium metal foil. Next, the copper foil and the lithium metal foil are wrapped with a laminate outer package. The first liquid 12 is injected into the laminate outer package. Immediately after the first liquid 12 is injected, the laminate outer package is hermetically sealed by thermal fusion to provide a potential measurement cell. In the potential measurement cell, the lithium metal foil is in contact with the first liquid 12, and the lithium metal is dissolved in the first liquid 12. At this time, an excessive amount of the lithium metal is dissolved in the first liquid 12, so that the first liquid 12 is saturated with lithium. As one example, the first liquid 12 is saturated with lithium 100 hours after the lithium metal foil is brought into contact with the first liquid 12. Next, the potential of the first liquid 12 is measured on the basis of lithium, using the copper foil and the lithium metal foil of the potential measurement cell. The provided measured value can be regarded as the equilibrium potential of the first liquid 12.

The first liquid 12 does not include an undesired compound. In the present specification, the undesired compound means an organic compound having an equilibrium potential of not less than 0.3 V vs. Li/Li$^+$ when a potential measurement test B is performed. On the other hand, an anode mediator has, for example, an equilibrium potential of less than 0.3 V vs. Li/Li$^+$ when the potential measurement test B is performed.

The potential measurement test B is performed, for example, by the following method. First, a 2-methyltetrahydrofuran solution including an anode mediator or the undesired compound at a concentration of 0.1 mol/L is prepared. Next, 2×2 cm copper foil is wrapped with a polypropylene microporous separator. Next, the entire separator is wrapped with a large amount of lithium metal foil. Next, tabs are attached to the copper foil and the lithium metal foil. Next, the copper foil and the lithium metal foil are wrapped with a laminate outer package. The 2-methyltetrahydrofuran solution is injected into the laminate outer package. Immediately after the 2-methyltetrahydrofuran solution is injected, the laminate outer package is hermetically sealed by thermal fusion to provide a potential measurement cell. In the potential measurement cell, the lithium metal foil is in contact with the 2-methyltetrahydrofuran solution, and the lithium metal is dissolved in the 2-methyltetrahydrofuran solution. At this time, an excessive amount of the lithium metal is dissolved in the 2-methyltetrahydrofuran solution, so that the 2-methyltetrahydrofuran solution is saturated with lithium. As one example, the 2-methyltetrahydrofuran solution is saturated with lithium after 100 hours after the lithium metal foil is brought into contact with the 2-methyltetrahydrofuran solution. Next, the potential of the 2-methyltetrahydrofuran solution is measured on the basis of lithium, using the copper foil and the lithium metal foil of the potential measurement cell. The provided measured value can be regarded as the equilibrium potential of the anode mediator or the undesired compound. This measured value is determined, depending on the kind of the anode mediator or the undesired compound.

When the potential measurement test B is performed, the equilibrium potential of the anode mediator may be not more than 0.16 V vs. Li/Li$^+$, not more than 0.1 V vs. Li/Li$^+$, or not more than 0.05 V vs. Li/Li$^+$, or not more than 0.02 V vs. Li/Li$^+$. When the potential measurement test B is performed, the equilibrium potential of the anode mediator is not particularly limited, and may be 0 V vs. Li/Li$^+$.

The anode mediator is, for example, an aromatic compound. The anode mediator may be a condensed aromatic compound. The anode mediator includes, for example, at least one selected from the group consisting of phenanthrene, biphenyl, o-terphenyl, triphenylene, anthracene, acenaphthene, acenaphthylene, fluoranthene, and benzyl. Tables 1 and 2 show the equilibrium potentials of these anode mediators when the potential measurement test B is performed.

TABLE 1

| Compound | Structure formula | Equilibrium potential (V vs. Li/Li$^+$) |
|---|---|---|
| Phenanthrene |  | 0.017 |
| Biphenyl |  | 0 |

TABLE 1-continued

| Compound | Structure formula | Equilibrium potential (V vs. Li/Li+) |
|---|---|---|
| o-terphenyl | 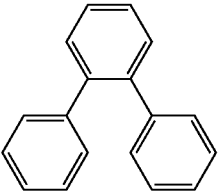 [SMILES: c1ccc(-c2ccccc2-c2ccccc2)cc1] | 0.0006 |
| Triphenylene | 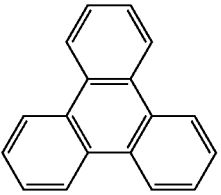 [SMILES: c1ccc2c(c1)c1ccccc1c1ccccc21] | 0.01 |
| Anthracene | 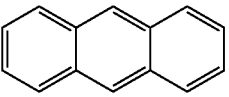 [SMILES: c1ccc2cc3ccccc3cc2c1] | 0.05 |

TABLE 2

| Compound | Structure formula | Equilibrium potential (V vs. Li/Li+) |
|---|---|---|
| Acenaphthene | 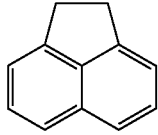 [SMILES: c1cc2c3c(cccc3c1)CC2] | 0.016 |
| Acenaphthylene | 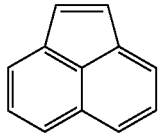 [SMILES: C1=Cc2cccc3cccc1c23] | 0.014 |
| Fluoranthene | 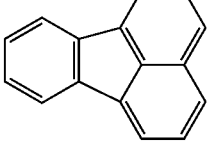 | 0.014 |
| Benzil | 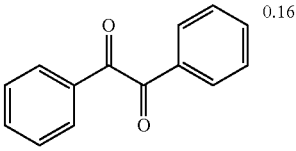 | 0.16 |

The undesired compounds include at least one selected from the group consisting of, for example, 2,2'-bipyridyl, benzophenone, trans-stilbene, 2,4'-bipyridyl, 2,3'-bipyridyl, cis-stilbene, propiophenone, butyrophenone, valerophenone, ethylenediamine, and tetraphenylcyclopentadienone. Tables 3 and 4 show the equilibrium potentials of these undesired compounds when the above potential measurement test B is performed.

TABLE 3

| Compound | Structure formula | Equilibrium potential (V vs. Li/Li+) |
|---|---|---|
| 2,2'-bipyridyl | 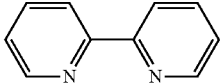 [SMILES: c1ccc(-c2ccccn2)nc1] | 0.4 |
| Benzophenone | 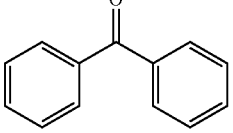 | 0.78 |
| trans-stilbene | 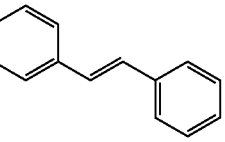 | 0.3 |
| 2,4'-bipyridyl | 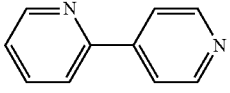 [SMILES: c1ccc(-c2ccncc2)nc1] | 0.54 |
| 2,3'-bipyridyl | 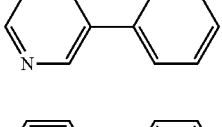 | 0.58 |
| cis-stilbene | 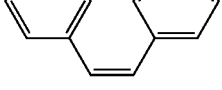 | 0.43 |

TABLE 4

| Compound | Structure formula | Equilibrium potential (V vs. Li/Li+) |
|---|---|---|
| Propiophenone | 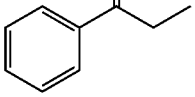 | 0.42 |
| Butyrophenone | 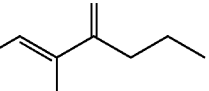 | 0.3 |
| Valerophenone | 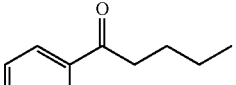 | 0.31 |
| Ethylenediamine | 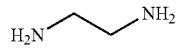 | 0.36 |

TABLE 4-continued

| Compound | Structure formula | Equilibrium potential (V vs. Li/Li$^+$) |
|---|---|---|
| Tetraphenyl cyclopentadienone | (structure shown) | 0.34 |

The anode mediator is oxidized or reduced by the anode 10 and is oxidized or reduced by the anode active material 14. The first liquid 12 includes, for example, only the anode mediator as a compound that is oxidized or reduced by the anode active material 14.

The anode mediator has been dissolved in the solvent of the first liquid 12, for example. The concentration of the anode mediator in the first liquid 12 may be not less than 0.001 mol/L, or not less than 0.025 mol/L. The concentration of the anode mediator in the first liquid 12 may be not more than 2 mol/L, or not more than 1 mol/L.

The solvent of the first liquid 12 can dissolve the anode mediator along with lithium. The solvent of the first liquid 12 is, for example, a non-aqueous solvent. The first liquid 12 includes, for example, an ether as the solvent. The first liquid 12 may include, as the solvent, an ether that is not co-inserted between graphite layers along with lithium cations. Examples of the ether include a cyclic ether and a glycol ether. The glycol ether may be a glyme represented by the composition formula $CH_3(OCH_2CH_2)_nOCH_3$. In this composition formula, n is an integer of not less than 1. The ether may include at least one selected from the group consisting of the cyclic ether and the glyme. In other words, the first liquid 12 may include the cyclic ether, the glyme, or a mixture of the cyclic ether and the glyme, as a solvent.

The cyclic ether includes at least one selected from the group consisting of, for example, tetrahydrofuran (THF), 2-methyltetrahydrofuran (2MeTHF), 1,3-dioxolane (1,3DO) and 4-methyl-1,3-dioxolane (4Me1,3DO).

The glyme includes, for example, at least one selected from the group consisting of diglyme (diethylene glycol dimethyl ether), triglyme (triethylene glycol dimethyl ether), tetraglyme (tetraethylene glycol dimethyl ether), pentaethylene glycol dimethyl ether, and polyethylene glycol dimethyl ether. The glyme may be a mixture of tetraglyme and pentaethylene glycol dimethyl ether.

The first liquid 12 may include a carbonate ester as a solvent. The carbonate ester may be a cyclic carbonate ester or a chain carbonate ester. The carbonate ester includes at least one selected from, for example, the group consisting of ethylene carbonate and ethyl methyl carbonate.

The potential of the first liquid 12 may be varied, depending on the type of solvent included in the first liquid 12. In a case where the solvent of the first liquid 12 includes the cyclic ether and where THF or 2MeTHF is used as the cyclic ether, the potential of the first liquid 12 tends to be further decreased. In a case where the solvent of the first liquid 12 includes glyme and where triglyme is used as the glyme, the potential of the first liquid 12 is most decreased. Therefore, the solvent of the first liquid 12 may be THF, 2MeTHF, or triglyme. However, the cyclic ether has a low boiling point and easily volatilizes. Therefore, the first liquid 12 may include a mixture of the cyclic ether and the glyme having a relatively high boiling point. In other words, the first liquid 12 may include a mixture of THF or 2MeTHF and triglyme. However, if a ratio of glyme in the solvent of the first liquid 12 is too high, the first liquid 12 may have a high potential. Therefore, the ratio of the volume of the cyclic ether and the volume of the glyme in the solvent of the first liquid 12 may be within the range of 10:0 to 7:3.

When lithium is added to the first liquid 12 including an aromatic compound as the anode mediator, the anode mediator receives electrons from the lithium. The electrons are released from the lithium, and the lithium is turned into lithium cations and dissolved in the first liquid 12. As just described, the first liquid 12 has a property of dissolving lithium as cations by causing the lithium to release the electrons. In the anode mediator that has received the electrons from the lithium, the anode mediator and the electrons are solvated. Thereby, the anode mediator is dissolved in the first liquid 12. The anode mediator having solvated electrons behaves as an anion. Thereby, the first liquid 12 has ionic conductivity. At this time, an equivalent amount of the electrons to that of lithium cations are present in the first liquid 12. Therefore, the first liquid 12 has strong reducibility and a low potential. Since the first liquid 12 does not have electronic conductivity, the first liquid 12 can function as an electrolytic liquid.

The first liquid 12 may further include an electrolyte salt. Examples of the electrolyte salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$.

The anode 10 has, for example, a surface that acts as a reaction field for the anode mediator. The material of the anode 10 is, for example, stable with respect to the first liquid 12. The material of the anode 10 is also stable with respect to an electrochemical reaction, for example. Examples of the material of the anode 10 include a metal and carbon. Examples of the metal used as the material of the anode 10 include stainless steel, iron, copper, and nickel. The material of the anode 10 is, for example, stainless steel.

The anode 10 may have a structure having an increased surface area. Examples of the structure having an increased surface area include a mesh, a nonwoven fabric, a surface-roughened plate, and a sintered porous body. If the anode 10 has these structures, the oxidation reaction and reduction reaction of the anode mediator in the anode 10 easily proceed.

The anode active material 14 includes, for example, at least one selected from the group consisting of graphite, aluminum, tin, and silicon. The anode active material 14 can occlude or release lithium. For example, during the charge of the flow battery 100, the anode active material 14 reacts with lithium to form a lithium compound. If the anode active material 14 has a layered structure, the lithium compound is, for example, an intercalation compound having lithium inserted between layers of the anode active material 14. If the anode active material 14 includes a metal, the lithium compound is, for example, an alloy including lithium. The anode active material 14 may include bismuth or indium. According to the anode active material 14, the flow battery 100 having a high energy density is provided.

If the anode active material 14 includes graphite, a graphite intercalation compound is generated during the charge of the flow battery 100. The graphite intercalation compound has, for example, at least one composition selected from the group consisting of $C_{24}Li$, $C_{18}Li$, $C_{12}Li$, and $C_6Li$. The upper limit potential at which the graphite intercalation compound is formed is, for example, 0.15 V vs. Li/Li$^+$. For example, the upper limit potential at which $C_6Li$ is formed is approximately 0.15 V vs. Li/Li$^+$. In the requirement (i), the first liquid 12 has an equilibrium potential of not more than 0.15 V vs. Li/Li$^+$ when the potential measurement test A is performed. For this reason, the flow battery 100 which satisfies the requirement (i) can perform a charge reaction using graphite. The anode mediator may be a compound which provides the first liquid 12 with an equilibrium potential of not more than 0.15 V vs. Li/Li$^+$ after the anode mediator is dissolved in the first liquid 12 along with lithium.

If the anode active material 14 includes aluminum, a LiAl alloy is generated during the charge of the flow battery 100. The LiAl alloy has, for example, at least one composition selected from the group consisting of LiAl, Li$_2$Al$_3$, and Li$_4$Al$_5$. The upper limit potential at which the LiAl alloy is formed is, for example, 0.18 V vs. Li/Li$^+$. In the requirement (ii), the first liquid 12 has an equilibrium potential of not more than 0.18 V vs. Li/Li$^+$ when the potential measurement test A is performed. For this reason, the flow battery 100 which satisfies the requirement (ii) can perform a charge reaction using aluminum. The anode mediator may be a compound which provides the first liquid 12 with an equilibrium potential of not more than 0.18 V vs. Li/Li$^+$ after the anode mediator is dissolved in the first liquid 12 along with lithium.

If the anode active material 14 includes tin, a LiSn alloy is generated during the charge of the flow battery 100. The LiSn alloy has, for example, at least one composition selected from the group consisting of Li$_{22}$Sn$_5$, Li$_7$Sn$_2$, Li$_{13}$Sn$_5$, Li$_7$Sn$_3$, Li$_5$Sn$_2$, LiSn, and Li$_2$Sn$_5$. The upper limit potential at which the LiSn alloy is formed is, for example, 0.25 V vs. Li/Li$^+$. In the requirement (iii), the first liquid 12 has an equilibrium potential of not more than 0.25 V vs. Li/Li$^+$ when the potential measurement test A is performed. For this reason, the flow battery 100 which satisfies the requirement (iii) can perform a charge reaction using tin. The anode mediator may be a compound which provides the first liquid 12 with an equilibrium potential of not more than 0.25 V vs. Li/Li$^+$ after the anode mediator is dissolved in the first liquid 12 along with lithium.

If the anode active material 14 includes silicon, a LiSi alloy is generated during the charge of the flow battery 100. The LiSi alloy has, for example, at least one composition selected from the group consisting of Li$_{22}$Si$_5$, Li$_{13}$Si$_4$, Li$_7$Si$_3$, and Li$_{12}$Si$_7$. The upper limit potential at which the LiSi alloy is formed is, for example, 0.25 V vs. Li/Li$^+$. In the requirement (iv), the first liquid 12 has an equilibrium potential of not more than 0.25 V vs. Li/Li$^+$ when the potential measurement test A is performed. For this reason, the flow battery 100 which satisfies the requirement (iv) can perform a charge reaction using silicon. The anode mediator may be a compound which provides the first liquid 12 with an equilibrium potential of not more than 0.25 V vs. Li/Li$^+$ after the anode mediator is dissolved in the first liquid 12 along with lithium.

A shape of the anode active material 14 is not specifically limited, and may be a powder form and a pellet form. The anode active material 14 may be hardened with a binder. Examples of the binder include resins such as polyvinylidene fluoride, polypropylene, polyethylene, and polyimide. The anode active material 14 is insoluble in the first liquid 12, for example.

The second liquid 22 is, for example, a non-aqueous electrolytic liquid. The second liquid 22 includes, for example, an electrolyte salt and a non-aqueous solvent that dissolves the electrolyte salt. The electrolyte salt includes, for example, lithium ions and anions. Examples of the electrolyte salt included in the second liquid 22 include the compounds exemplified as the electrolyte salt included in the first liquid 12. Examples of the non-aqueous solvent include cyclic and chain carbonate esters, cyclic and chain esters, cyclic and chain ethers, nitriles, cyclic and chain sulfones, and cyclic and chain sulfoxides. The non-aqueous solvent included in the second liquid 22 may be the same as or different from the solvent included in the first liquid 12.

The second liquid 22 may further include a cathode mediator. In this case, the flow battery 100 further comprises a cathode active material 24 which is in contact with the second liquid 22. The capacity density of the flow battery is determined in accordance with "cathode capacity density× anode capacity density/(cathode capacity density+anode capacity density)". Therefore, the capacity density of the flow battery 100 can be significantly improved by employing a mediator-type flow battery structure not only in the anode 10 but also in the cathode 20 of the flow battery 100. The cathode mediator is dissolved in, for example, the second liquid 22. The cathode mediator is oxidized or reduced by the cathode 20 and is oxidized or reduced by the cathode active material 24. The cathode mediator may include one kind of redox species having a plurality of redox potentials, or may include a plurality of kinds of redox species each having one redox potential. The cathode mediator may be an organic compound having two or more redox potentials. This organic compound has, for example, a π-conjugated electron cloud. Examples of the organic compound having a π-conjugated electron cloud include a tetrathiafulvalene derivative, a quinone derivative, and TCNQ. The cathode mediator is, for example, tetrathiafulvalene. If the cathode mediator is an organic compound, the cathode mediator can be easily dissolved in the second liquid 22.

The cathode mediator may be a metal-containing ion. Examples of the metal-containing ions include vanadium ions, manganese ions, and molybdenum ions. These metal-containing ions have multi-stage redox potentials. For example, vanadium ions have multiple reaction stages such as divalent to trivalent, trivalent to tetravalent, and tetravalent to pentavalent.

The cathode 20 has, for example, a surface that acts as a reaction field for the cathode mediator. The material of the cathode 20 is stable with respect to the solvent and the electrolyte salt included in the second liquid 22, for example. The material of the cathode 20 may be insoluble in the second liquid 22. The material of the cathode 20 is stable with respect to an electrochemical reaction, for example. Examples of the material of the cathode 20 include a metal and carbon. Examples of the metal used as the material of the cathode 20 include stainless steel, iron, copper, and nickel. The material of the cathode 20 is, for example, stainless steel. The material of the cathode 20 may be the same as or different from the material of the anode 10.

The cathode 20 may have a structure having an increased surface area. Examples of the structure having an increased surface area include a mesh, a nonwoven fabric, a surface-roughened plate, and a sintered porous body. If the cathode 20 has these structures, the oxidation reaction and reduction reaction of the cathode mediator in the cathode 20 easily proceed.

If the second liquid 22 does not include the cathode mediator, the cathode 20 may include a current collector and an active material provided on the current collector. The current collector is formed of, for example, the material described above as the material of the cathode 20. The active material included in the cathode 20 is formed of, for example, a material for the cathode active material 24, which will be described later. The cathode 20 may be a lithium metal.

As described above, if the second liquid 22 includes the cathode mediator, the flow battery 100 further includes the cathode active material 24. The cathode active material 24 is immersed in the second liquid 22. The cathode active material 24 can occlude or release lithium. The cathode active material 24 may be an active material which is used for a secondary battery. Examples of the cathode active material 24 include transition metal oxides, fluorides, polyanions, fluorinated polyanions, and transition metal sulfides.

The cathode active material 24 may include a compound including iron, manganese, or lithium, a compound including titanium, niobium, or lithium, or a compound including vanadium. Examples of the compound including iron, manganese or lithium include $LiFePO_4$ and $LiMnO_2$. Examples of the compound including titanium, niobium or lithium include $Li_4Ti_5O_{12}$ and $LiNbO_3$. Examples of the compound including vanadium include $V_2O_5$. The cathode active material 24 includes, for example, lithium iron phosphate ($LiFePO_4$).

The compound including iron, manganese or lithium and the compound including vanadium have, for example, a redox potential within the range of 3.2 V to 3.7 V on the basis of lithium. If the cathode active material 24 includes these compounds, the cathode mediator may be tetrathiafulvalene. In this case, the flow battery 100 has a high battery voltage. Tetrathiafulvalene has two relatively high redox potentials. The redox potential of tetrathiafulvalene has a lower limit value of approximately 3.4 V and an upper limit value of approximately 3.7 V on the basis of lithium.

The compound including titanium, niobium or lithium has a redox potential within the range of 1 V to 3 V on the basis of lithium, for example. If the cathode active material 24 includes a compound including titanium, niobium, or lithium, the cathode mediator may be a quinone derivative. The quinone derivative has, for example, a plurality of redox potentials within the range of 1 V to 3 V on the basis of lithium.

The range of the potential within which the cathode active material 24 is oxidized/reduced overlaps, for example, the range of the potential within which the cathode mediator is oxidized/reduced. The upper limit value of the range of the potential within which the cathode mediator is oxidized/reduced is, for example, larger than the upper limit value of the potential range within which the cathode active material 24 is oxidized/reduced. The lower limit value of the potential range within which the cathode mediator is oxidized/reduced is, for example, smaller than the lower limit value of the potential range within which the cathode active material 24 is oxidized/reduced. Thereby, the capacity of the cathode active material 24 can fully be utilized. For example, the capacity of the cathode active material 24 can be used nearly 100%.

The cathode active material 24 may further include a conductive assistant agent or an ionic conductor. Examples of the conductive assistant agent include carbon black and polyaniline. Examples of the ionic conductor include polymethyl methacrylate and polyethylene oxide.

The shape of the cathode active material 24 is not particularly limited, and may be a powder, a pellet, or a film. The film-shaped cathode active material 24 may be fixed on metal foil. The cathode active material 24 may be hardened with a binder. Examples of the binder include resins such as polyvinylidene fluoride, polypropylene, polyethylene, and polyimide. The cathode active material 24 is insoluble in the second liquid 22, for example.

The lithium ion conductive film 30 electrically separates the anode 10 and the cathode 20 from each other. Examples of the lithium ion conductive film 30 include a porous film, an ion exchange resin film, and a solid electrolyte film. Examples of the porous film include glass paper formed by weaving glass fibers into a nonwoven fabric. Examples of the ion exchange resin film include a cation exchange film and an anion exchange film.

The flow battery 100 may further comprise an electrochemical reaction part 60, an anode terminal 16, and a cathode terminal 26.

The electrochemical reaction part 60 is separated into an anode chamber 61 and a cathode chamber 62 with the lithium ion conductive film 30.

The anode 10 is disposed in the anode chamber 61.

The anode terminal 16 is connected to the anode 10.

The cathode 20 is disposed in the cathode chamber 62.

The cathode terminal 26 is connected to the cathode 20.

The anode terminal 16 and the cathode terminal 26 are connected to, for example, a charge/discharge device. A voltage is applied between the anode terminal 16 and the cathode terminal 26 with the charge/discharge device. Alternatively, electric power is taken out between the anode terminal 16 and the cathode terminal 26.

The flow battery 100 may further comprise a first circulation mechanism 40 and a second circulation mechanism 50.

The first circulation mechanism 40 is a mechanism for circulating the first liquid 12 between the anode 10 and the anode active material 14.

The first circulation mechanism 40 may comprise a pipe 43, a pipe 44, and a pump 45. In order to distinguish between the pipes, the pipe 43 and the pipe 44 may be referred to as a first pipe and a second pipe, respectively.

The first circulation mechanism 40 further comprises a first storage part 41. The first storage part 41 comprises the anode active material 14 in the inside thereof.

A part of the first liquid 12 is stored in the first storage part 41. A part of the first liquid 12 is stored in the anode chamber 61. At least a part of the anode 10 is in contact with the first liquid 12 in the anode chamber 61.

One end of the pipe 43 is connected to the outlet of the first liquid 12 in the first storage part 41.

The pump 45 is provided in the pipe 44, for example. The pump 45 may be provided in the pipe 43.

The first circulation mechanism 40 may comprise a first filter 42.

The first filter 42 prevents the anode active material 14 from passing therethrough.

The first filter 42 is provided in a path through which the first liquid 12 flows from the first storage part 41 to the anode chamber 61. In FIG. 1, the first filter 42 is provided in the pipe 43.

The second circulation mechanism 50 is a mechanism for circulating the second liquid 22 between the cathode 20 and the cathode active material 24.

The second circulation mechanism 50 may comprise a pipe 53, a pipe 54, and a pump 55. In order to distinguish between the pipes, the pipe 53 and the pipe 54 may be referred to as a first pipe and a second pipe, respectively.

The second circulation mechanism 50 further comprises a second storage part 51. The second storage part 51 comprises the cathode active material 24 in the inside thereof.

A part of the second liquid 22 is stored in the second storage part 51. A part of the second liquid 22 is stored in the cathode chamber 62. At least a part of the cathode 20 is in contact with the second liquid 22 in the cathode chamber 62.

One end of the pipe 53 is connected to the outlet of the second liquid 22 in the second storage part 51.

The pump 55 is provided in the pipe 54, for example. The pump 55 may be provided in the pipe 53.

The second circulation mechanism 50 may comprise a second filter 52.

The second filter 52 prevents the cathode active material 24 from passing therethrough.

The second filter 52 is provided in a path through which the second liquid 22 flows from the second storage part 51 to the cathode chamber 62. In FIG. 1, the second filter 52 is provided in the pipe 53.

Figure 2:
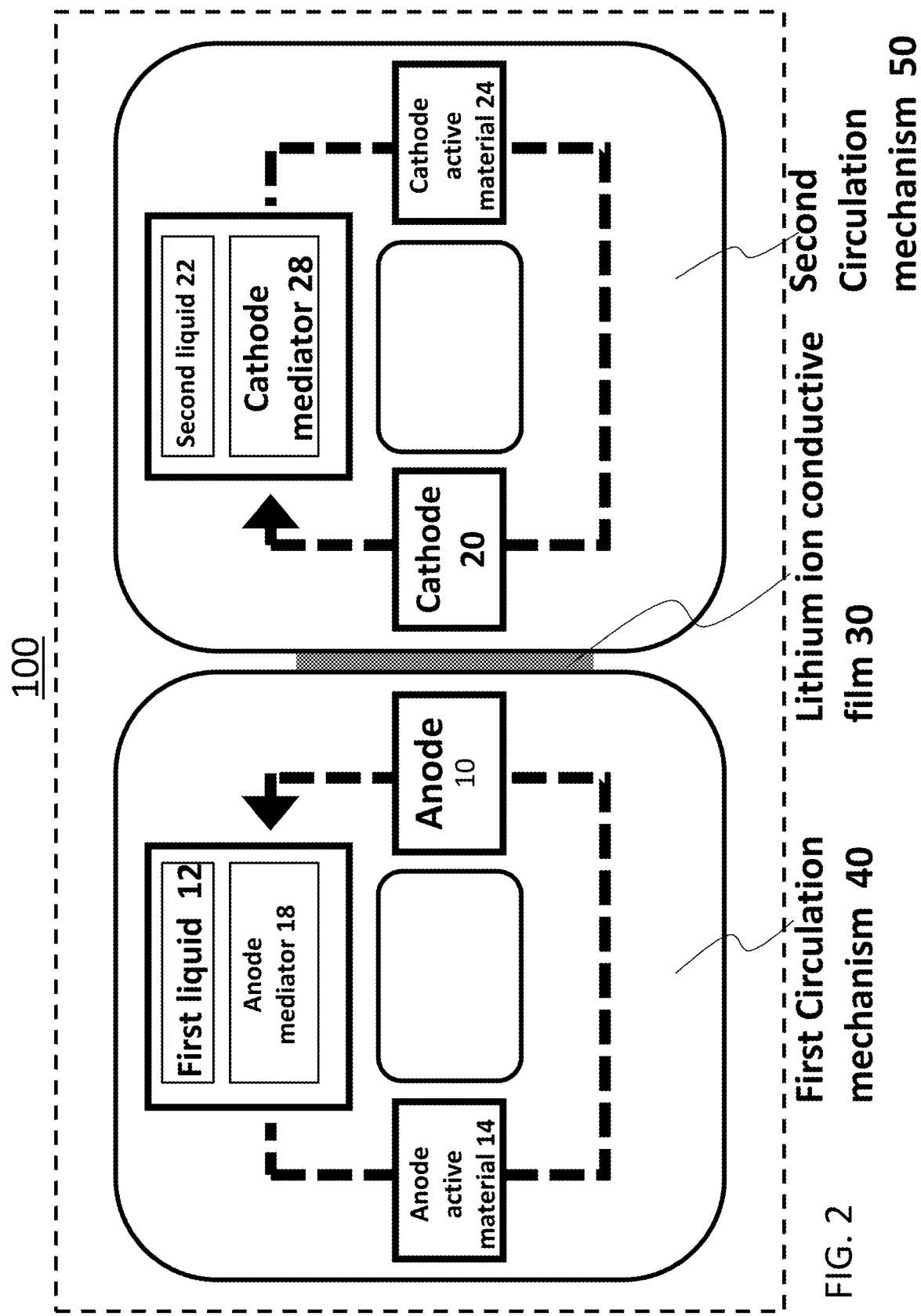
FIG. 2 is a diagram for explaining operation of the flow battery shown in FIG. 1.

Next, operation of the flow battery 100 will be described with reference to FIG. 2. FIG. 2 is a diagram for explaining the operation of the flow battery 100 shown in FIG. 1. In the following description, the anode mediator 18 is sometimes referred to as "Md". The anode active material 14 is sometimes referred to as "NA". In the following description, it is assumed that tetrathiafulvalene (hereinafter, sometimes referred to as "TTF") is used as the cathode mediator 28. It is assumed that lithium iron phosphate (LiFePO$_4$) is used as the cathode active material 24.

[Charge Process of Flow Battery]

First, the flow battery 100 is charged by applying a voltage to the anode 10 and the cathode 20 of the flow battery 100. Hereinafter, the reactions on the anode 10 and the reactions on the cathode 20 in the charge process will be described.

(Reaction on Anode)

Electrons are supplied to the anode 10 from the outside of the flow battery 100 by applying the voltage. Thereby, the anode mediator 18 is reduced on a surface of the anode 10. The reduction reaction of the anode mediator 18 is represented by the following reaction formula, for example. Lithium ions (Li$^+$) are supplied from the second liquid 22 through the lithium ion conductive film 30, for example.

$$Md + Li^+ + e^- \rightarrow Md.Li$$

In the above reaction formula, Md.Li is a composite of the lithium cation and the reduced anode mediator 18. The reduced anode mediator 18 has electrons solvated with the solvent of the first liquid 12. As the reduction reaction of the anode mediator 18 proceeds, the concentration of Md.Li in the first liquid 12 increases. As the concentration of Md.Li in the first liquid 12 increases, the potential of the first liquid 12 decreases. In the present embodiment, the potential of the first liquid 12 decreases to a value lower than the upper limit potential at which the anode active material 14 and lithium form a lithium compound.

Next, Md.Li is sent to the anode active material 14 with the first circulation mechanism 40. In the present embodiment, the potential of the first liquid 12 is lower than the upper limit potential at which the anode active material 14 and lithium form the lithium compound. Therefore, the anode active material 14 receives lithium cations and electrons from Md.Li. Thereby, the anode mediator 18 is oxidized and the anode active material 14 is reduced. This reaction is represented by the following reaction formula, for example. However, in the following reaction formula, the values of s and t are integers of not less than 1.

$$sNA + tMd.Li \rightarrow NA_sLi_t + tMd$$

In the above reaction formula, NA$_s$Li$_t$ is a lithium compound formed of the anode active material 14 and lithium. If the anode active material 14 includes graphite, in the above reaction formula, for example, the value of s is 6 and the value of t is 1. In this case, NA$_s$Li$_t$ is C$_6$Li. If the anode active material 14 includes aluminum, tin, or silicon, in the above reaction formula, for example, the value of s is 1 and the value of t is 1. In this case, NA$_s$Li$_t$ is LiAl, LiSn, or LiSi.

Next, the anode mediator 18 oxidized by the anode active material 14 is sent to the anode 10 with the first circulation mechanism 40. The anode mediator 18 sent to the anode 10 is reduced again on the surface of the anode 10. Thereby, Md.Li is generated. As just described, the anode mediator 18 is circulated to charge the anode active material 14. In other words, the anode mediator 18 functions as a charge mediator.

(Reaction on Cathode)

The cathode mediator 28 is oxidized on the surface of the cathode 20 by applying the voltage. Thereby, electrons are taken out from the cathode 20 to the outside of the flow battery 100. The oxidation reaction of the cathode mediator 28 is represented by the following reaction formulas, for example.

$$TTF \rightarrow TTF^+ + e^-$$

$$TTF^+ \rightarrow TTF^{2+} + e^-$$

Next, the cathode mediator 28 oxidized at the cathode 20 is sent to the cathode active material 24 with the second circulation mechanism 50. The cathode mediator 28 sent to the cathode active material 24 is reduced by the cathode active material 24. On the other hand, the cathode active material 24 is oxidized by the cathode mediator 28. The cathode active material 24 oxidized by the cathode mediator 28 releases lithium. This reaction is represented by the following reaction formula, for example.

$$LiFePO_4 + TTF^{2+} \rightarrow FePO_4 + Li^+ + TTF^+$$

Next, the cathode mediator 28 reduced by the cathode active material 24 is sent to the cathode 20 with the second circulation mechanism 50. The cathode mediator 28 sent to the cathode 20 is oxidized again on the surface of the cathode 20. This reaction is represented by the following reaction formula, for example.

$$TTF^+ \rightarrow TTF^{2+} + e^-$$

As just described, the cathode active material 24 is charged by circulating the cathode mediator 28. In other words, the cathode mediator 28 functions as a charge mediator. Lithium ions (Li$^+$) generated by charging the flow battery 100 are moved to the first liquid 12 through the lithium ion conductive film 30, for example.

[Discharge Process of Flow Battery]

In the charged flow battery 100, electric power can be taken out from the anode 10 and the cathode 20. Hereinafter, the reactions on the anode 10 and on the cathode 20 in the discharge process will be described.

(Reaction on Anode)

Due to the discharge of the flow battery 100, the anode mediator 18 is oxidized on the surface of the anode 10. Thereby, electrons are taken out from the anode 10 to the outside of the flow battery 100. The oxidation reaction of the anode mediator 18 is represented by the following reaction formula, for example.

$$Md.Li \rightarrow Md + Li^+ + e^-$$

As the oxidation reaction of the anode mediator 18 proceeds, the concentration of Md.Li in the first liquid 12 decreases. As the concentration of Md.Li in the first liquid 12 decreases, the potential of the first liquid 12 increases.

Thereby, the potential of the first liquid 12 exceeds the equilibrium potential of $NA_sLi_t$.

Next, the anode mediator 18 oxidized at the anode 10 is sent to the anode active material 14 with the first circulation mechanism 40. If the potential of the first liquid 12 exceeds the equilibrium potential of $NA_sLi_t$, the anode mediator 18 receives lithium cations and electrons from $NA_sLi_t$. Thereby, the anode mediator 18 is reduced and the anode active material 14 is oxidized. This reaction is represented by the following reaction formula, for example. In the following reaction formula, the values s and t are integers of not less than 1.

$$NA_sLi_t + t\text{Md} \rightarrow sNA + t\text{Md.Li}$$

Next, Md.Li is sent to the anode 10 with the first circulation mechanism 40. Md.Li sent to the anode 10 is oxidized again on the surface of the anode 10. In this way, the anode active material 14 is discharged by circulating the anode mediator 18. In other words, the anode mediator 18 functions as a discharge mediator. Lithium ions ($Li^+$) generated due to the discharge of the flow battery 100 is moved to the second liquid 22 through, for example, the lithium ion conductive film 30.

(Reaction on Cathode)

Electrons are supplied to the cathode 20 from the outside of the flow battery 100 by discharging the flow battery 100. Thereby, the cathode mediator 28 is reduced on the surface of the cathode 20. The reduction reaction of the cathode mediator 28 is represented by the following reaction formulas, for example.

$$TTF^{2+} + e^- \rightarrow TTF^+$$

$$TTF^+ + e^- \rightarrow TTF$$

Next, the cathode mediator 28 reduced at the cathode 20 is sent to the cathode active material 24 with the second circulation mechanism 50. The cathode mediator 28 sent to the cathode active material 24 is oxidized by the cathode active material 24. On the other hand, the cathode active material 24 is reduced by the cathode mediator 28. The cathode active material 24 reduced by the cathode mediator 28 occludes lithium. This reaction is represented by the following reaction formula, for example. Lithium ions ($Li^+$) are supplied from the first liquid 12 through the lithium ion conductive film 30, for example.

$$FePO_4 + Li^+ + TTF \rightarrow LiFePO_4 + TTF^+$$

Next, the cathode mediator 28 oxidized by the cathode active material 24 is sent to the cathode 20 with the second circulation mechanism 50. The cathode mediator 28 sent to the cathode 20 is reduced again on the surface of the cathode 20. This reaction is represented by the following reaction formula, for example.

$$TTF^+ + e^- \rightarrow TTF$$

As just described, the cathode active material 24 is discharged by circulating the cathode mediator 28. In other words, the cathode mediator 28 functions as a discharge mediator.

As described above, the anode mediator 18 of the present embodiment has both the function of the charge mediator and the function of the discharge mediator. Therefore, the first liquid 12 of the flow battery 100 does not require the undesired compound which functions as the discharge mediator. As just described, the flow battery 100 of the present embodiment does not require the undesired compound and has a simple configuration.

In general, the charge/discharge voltage difference of the flow battery is affected by the difference between the reduction potential of the charge mediator and the oxidation potential of the discharge mediator. In the present embodiment, since the first liquid 12 of the flow battery 100 does not include the undesired compound, the charge/discharge voltage difference of the flow battery 100 is smaller than that of a conventional flow battery including the undesired compound. Therefore, in the flow battery 100 of the present embodiment, it is possible to suppress a decrease in electric power efficiency during charge/discharge. Furthermore, since the flow battery 100 of the present embodiment includes the anode active material 14, the flow battery 100 has a high energy density. By using the anode mediator 18 of the present embodiment, for example, the flow battery 100 having a battery voltage of not less than 3.0 V can be realized.

In another aspect of the present disclosure, the present disclosure provides a flow battery 100, comprising:

the first liquid 12;

a first electrode 10 immersed in the first liquid 12;

the first active material 14 immersed in the first liquid 12; and a second electrode 20 which is a counter electrode of the first electrode 10, wherein at least one requirement selected from the group consisting of the following requirements (a) and (b) is satisfied.

(a) The first liquid 12 includes the first electrode mediator 18 which provides the first liquid 12 with equilibrium potential of not more than the upper limit potential at which the compound of lithium and the first active material 14 is formed by dissolving the first electrode mediator 18 in the first liquid 12 along with lithium, and the first liquid 12 does not include the compound which provides the first liquid 12 with the equilibrium potential of more than the upper limit potential by dissolving the compound in the first liquid 12 along with lithium.

(b) the first liquid 12 includes, as the first electrode mediator 18, only a compound which provides the first liquid 12 with the equilibrium potential of not more than the upper limit potential at which the compound of lithium and the first active material 14 is formed by dissolving the compound in the first liquid 12 along with lithium.

[Energy Density of Flow Battery]

In a case where $LiFePO_4$ is used as the cathode active material 24, tetrathiafulvalene is used as the cathode mediator 28, graphite is used as the anode active material 14, and where biphenyl is used as the anode mediator 18, the energy density of the flow battery 100 is estimated to be 590 Wh/L. In a case where aluminum is used in place of graphite as the anode active material 14 of the flow battery 100, the energy density of the flow battery 100 is estimated to be 984 Wh/L. In a case where tin is used in place of graphite as the anode active material 14 of the flow battery 100, the energy density of the flow battery 100 is estimated to be 857 Wh/L. In a case where silicon is used in place of graphite as the anode active material 14 of the flow battery 100, the energy density of the flow battery 100 is estimated to be 650 Wh/L.

On the other hand, a theoretical energy density of a conventional vanadium flow battery is approximately 38 Wh/L. From this result, it can be seen that a theoretical energy density of the flow battery 100 of the present embodiment is much higher than that of the conventional flow battery.

[Findings which Establishes the Fundamentals of the Present Disclosure]

Conventionally, a vanadium flow battery using $VOSO_4$/$(VO_2)_2SO_4$ as a cathode active material and $V_2(SO_4)_3$/$VSO_4$ as an anode active material are known. In the vanadium flow battery, water is usually used as a solvent for the cathode solution and the anode solution. The vanadium flow battery has the following problems.

Since the solvent of the cathode solution and the anode solution is water, only an active material having a potential within a range which does not exceed a voltage of water splitting can be used, and the battery voltage is limited to not more than 1.5 V. Vanadium sulfate does not have high solubility in water, and the concentration of vanadium sulfate in an aqueous solution is approximately 2 mol/L at the maximum. The theoretical capacity density of the cathode solution and the anode solution is determined depending on the concentration of the active material. If the concentration of vanadium sulfate in the aqueous solution is 2 mol/L, the theoretical capacity density is a small value of approximately 53.5 Ah/L. Since the flow battery has a low voltage and a low capacity density, the energy density of the flow battery is inevitably low. This prevents spread of vanadium flow batteries. Thus, attempts have been made to improve the voltage by changing the solvent of the cathode solution and the anode solution from water to a non-aqueous solvent, and to further improve the energy density.

As a flow battery using a non-aqueous solvent, a cathode solution in which a quinone derivative has been dissolved in a non-aqueous solvent has been proposed. Patent Literature 1 proposes a flow battery using a peroxide such as $KMnO_4$ or $K_2Cr_2O_7$, or a methanol solution of halogen such as $I_2$. However, a flow battery using a quinone derivative has a low capacity density, since the solubility of the quinone derivative in the non-aqueous solvent is low. A flow battery using a peroxide such as $KMnO_4$ or $K_2Cr_2O_7$ can be discharged, but cannot be used as a secondary battery due to a problem in charge. A flow battery using a halogen such as $I_2$ can be charged and discharged, and the halogen concentration with respect to the non-aqueous solvent is relatively high. However, in this flow battery, there is a problem that a strict sealing technique is required, since it is necessary to hermetically seal the halogen itself, which has a high sublimation property.

As described above, there is a fundamental problem in increasing the energy density of these flow batteries. In a flow battery that uses only the active material included in the solution, the concentration of the active material in the solution determines the capacity density of the flow battery. Therefore, in order to increase the capacity density of the flow battery, it is necessary to increase the concentration of the active material in the solution to the maximum. However, it is not easy to increase the concentration of the active material in the solution, and the concentration is less than approximately 10 mol/L at the maximum. In the present specification, a type of a flow battery that uses only an active material included in a solution is sometimes referred to as a "simple solution type flow battery".

International Publication No. 2018/016249 proposes a flow battery using a mediator for the purpose of solving the problem of the simple solution type flow battery. Specifically, International Publication No. 2018/016249 proposes a flow battery in which a solid active material having a high capacity density is disposed in a cathode tank. In this flow battery, the solid active material is chemically oxidized/reduced with an electrochemically oxidized/reduced mediator. Tetrathiafulvalene (TTF) is used as the mediator.

As described above, according to the mediator included in the cathode solution, the capacity density of the cathode is determined depending on the capacity density of the solid active material in the cathode tank and does not depend on the concentration of the active material in the cathode solution. Therefore, the capacity density of the cathode is significantly improved. However, since the capacity density of the flow battery is determined in accordance with cathode capacity density×anode capacity density/(cathode capacity density+anode capacity density), if the anode solution is a simple solution type solution using only the active material included in the solution similarly to the conventional anode solution, the capacity density of the flow battery cannot be significantly improved. In order to significantly improve the capacity density of the flow battery, it is necessary to dispose a solid active material in the anode tank and to use a mediator.

United States Patent Application Publication No. 2015/0255803 discloses a mechanism of a flow battery using a charge mediator and a discharge mediator. In this flow battery, the reduced charge mediator reduces the anode active material during charge. During discharge, the discharge mediator oxidizes the anode active material, and thereby the discharge mediator itself is reduced. As the reduced discharge mediator is electrochemically oxidized on the electrode, the flow battery is discharged. However, if this mechanism is used, the difference between the reduction potential of the charge mediator and the oxidation potential of the discharge mediator affects the charge/discharge voltage difference, and thus the charge/discharge voltage difference is large. Therefore, electric power efficiency during the charge/discharge of the flow battery is decreased.

EXAMPLES

The present disclosure will be described concretely on the basis of the examples. However, the present disclosure is not limited at all by the following examples.

Measurement Example for Graphite

Measurement Example 1

First, a 2-methyltetrahydrofuran solution in which 1 mol/L of $LiPF_6$ was dissolved was prepared. Next, a 20 mm square graphite electrode was wrapped with a separator. Next, the whole separator was wrapped with a large amount of lithium metal foil. Next, tabs were attached to the graphite electrode and the lithium metal foil. Next, the graphite electrode and the lithium metal foil were wrapped with a laminate outer package. The 2-methyltetrahydrofuran solution was injected into the laminate outer package. Immediately after the 2-methyltetrahydrofuran solution was injected, the laminate outer package was hermetically sealed by thermal fusion to provide the cell of the measurement example 1.

Figure 3A:
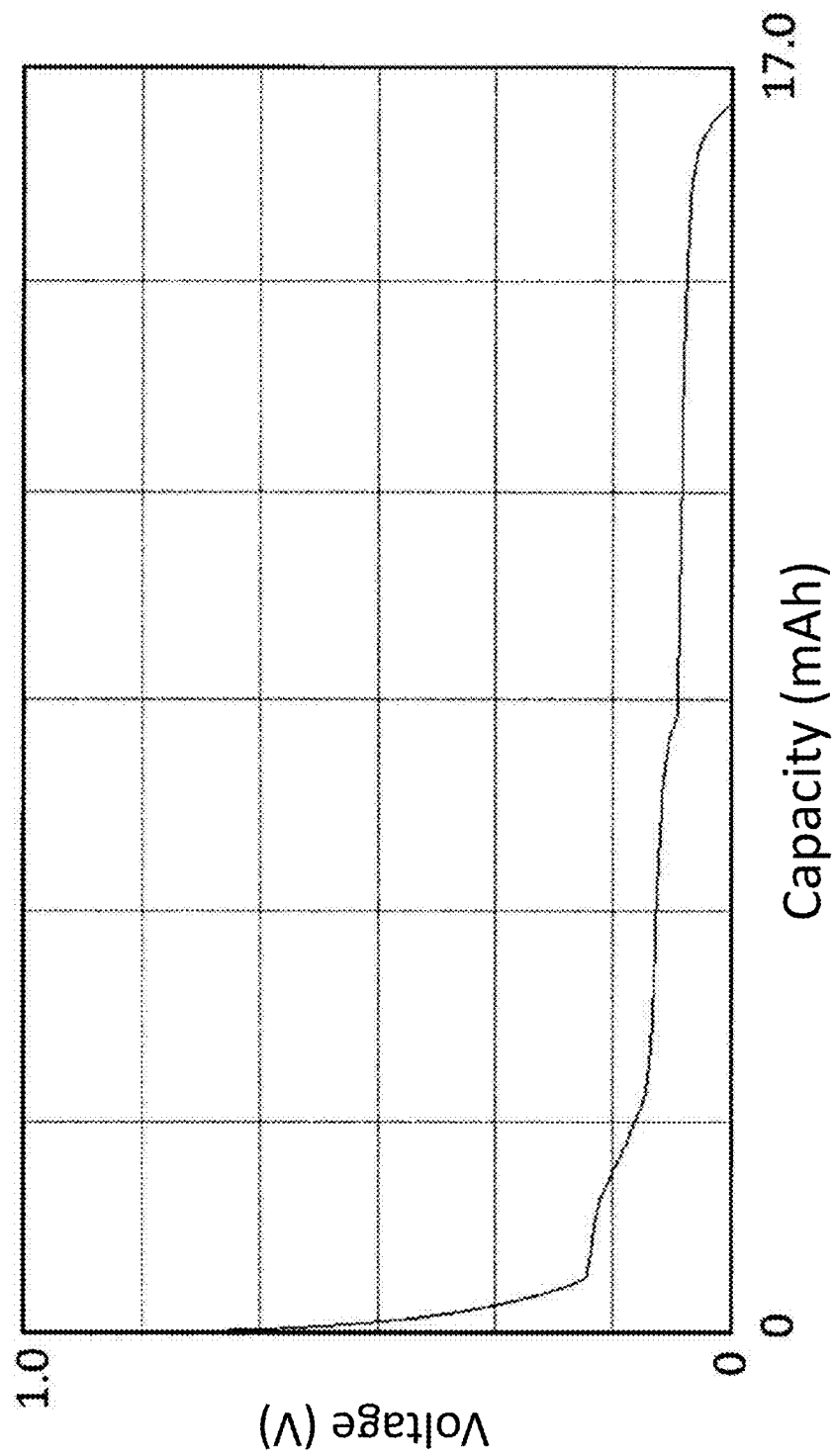
FIG. 3A is a graph showing a charge curve of a cell of the measurement example 1.

Next, the cell of the measurement example 1 was charged through the graphite electrode and the lithium metal foil. During the charge of the cell, the charge current was set to 0.25 mA/cm². The charge of the cell was performed, until the potential of the graphite electrode reached 0 V vs. Li/Li⁺. Thereby, a charge curve of the cell of the measurement example 1 was provided. FIG. 3A is a graph showing the charge curve of the cell of the measurement example 1. From the result of FIG. 3A, it can be seen that, in a case where the anode active material of the flow battery includes graphite and where the first liquid of the flow battery has an equilibrium potential of not more than 0.15 V vs. Li/Li$^+$, the charge reaction of the flow battery proceeds sufficiently.

Measurement Example 2

First, a 2-methyltetrahydrofuran solution A in which 0.1 mol/L of biphenyl and 1 mol/L of LiPF$_6$ were dissolved was prepared. As shown in Table 1, biphenyl is a compound having an equilibrium potential of 0 V vs. Li/Li$^+$, when the above-described potential measurement test B is performed. The 2-methyltetrahydrofuran solution A was colorless and transparent. Next, a 2-methyltetrahydrofuran solution B in which 1 mol/L of LiPF$_6$ was dissolved and no biphenyl was included was prepared. Next, a container in which the inside thereof was partitioned with a lithium ion conductive inorganic solid electrolyte which functioned as a diaphragm was prepared. Li$_7$La$_3$Zr$_2$O$_{12}$ (LLZ) was used as the lithium ion conductive inorganic solid electrolyte. In the container, foamed stainless steel was disposed as a current collector in one space partitioned by LLZ. The foamed stainless steel was a porous body having a large specific surface area. In the container, a lithium metal was placed in the other space partitioned by LLZ. Next, 1 mL of the 2-methyltetrahydrofuran solution A was added to the one space. The 2-methyltetrahydrofuran solution B was added to the other space. An active material was further added to the one space along with the 2-methyltetrahydrofuran solution A. As the active material, 2.4 mg of graphite was used. The graphite was arranged on copper foil cut into 3×5 mm square. A laminate of graphite and the copper foil was prepared by coating a graphite dispersion on the copper foil and drying the resulting coating. The laminate of the graphite and the copper foil was wrapped with a separator. The separator had holes each having a size that allows biphenyl to pass through. The cell of the measurement example 2 was provided by the above method.

Figure 3B:
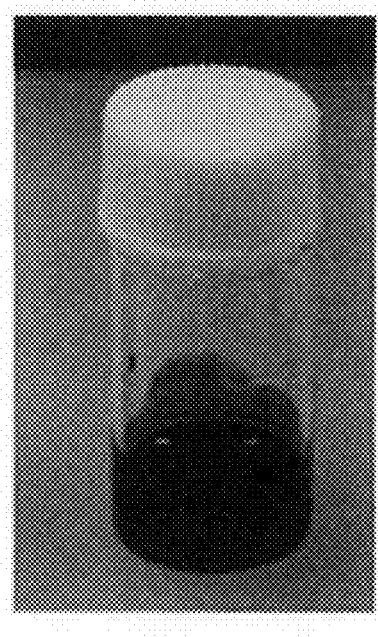
FIG. 3B is an image of a 2-methyltetrahydrofuran solution after a voltage was applied to a cell of the measurement example 2.
Figure 3C:
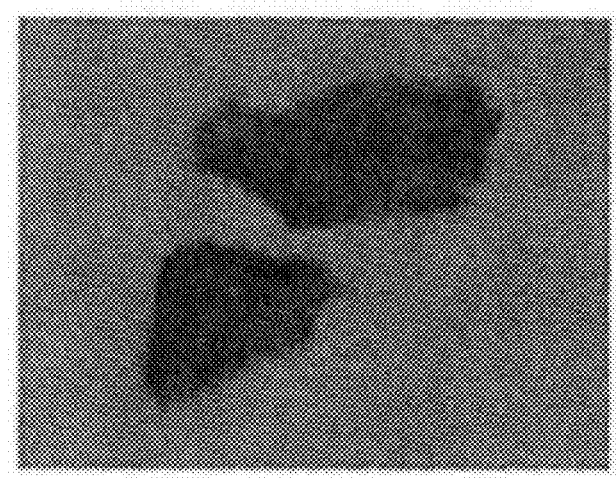
FIG. 3C is an image of an active material after the voltage was applied to the cell of the measurement example 2.

Next, a voltage was applied to the cell of the measurement example 2 through the foamed stainless steel and the lithium metal. FIG. 3B is an image of the 2-methyltetrahydrofuran solution A after the voltage was applied to the cell of the measurement example 2. As can be seen from FIG. 3B, the application of the voltage to the cell of the measurement example 2 colored the 2-methyltetrahydrofuran solution A. From this, it is conceivable that lithium biphenyl was produced in the 2-methyltetrahydrofuran solution A by reducing biphenyl on the surface of the foamed stainless steel. FIG. 3C is an image of the active material after the voltage was applied to the cell of the measurement example 2. By applying the voltage to the cell of the measurement example 2, the color of the active material was changed to gold. From this, it is conceivable that graphite was reduced by lithium biphenyl, and that a graphite intercalation compound C$_6$Li was formed. As described above, in the cell of the measurement example 2, it can be seen that biphenyl functioned as a charge mediator and graphite was used for the charge reaction. From this, it is conceivable that, in the cell of the measurement example 2 to which voltage was applied, the equilibrium potential of the 2-methyltetrahydrofuran solution A was not more than 0.15 V vs. Li/Li$^+$.

Measurement Example 3

The cell of measurement example 3 was produced in the same manner as in the measurement example 2, except that an excessive amount of the lithium metal was immersed in the 2-methyltetrahydrofuran solution A, the 2-methyltetrahydrofuran solution A was saturated with lithium, and that the graphite intercalation compound C$_6$Li was added to the container in place of the graphite. A discharge curve was provided by discharging the cell of the measurement example 3.

Measurement Example 4

The cell of the measurement example 4 was produced in the same manner as in the measurement example 3, except that the graphite intercalation compound C$_6$Li was not added to the container. A discharge curve was provided by discharging the cell of the measurement example 4.

Figure 3D:
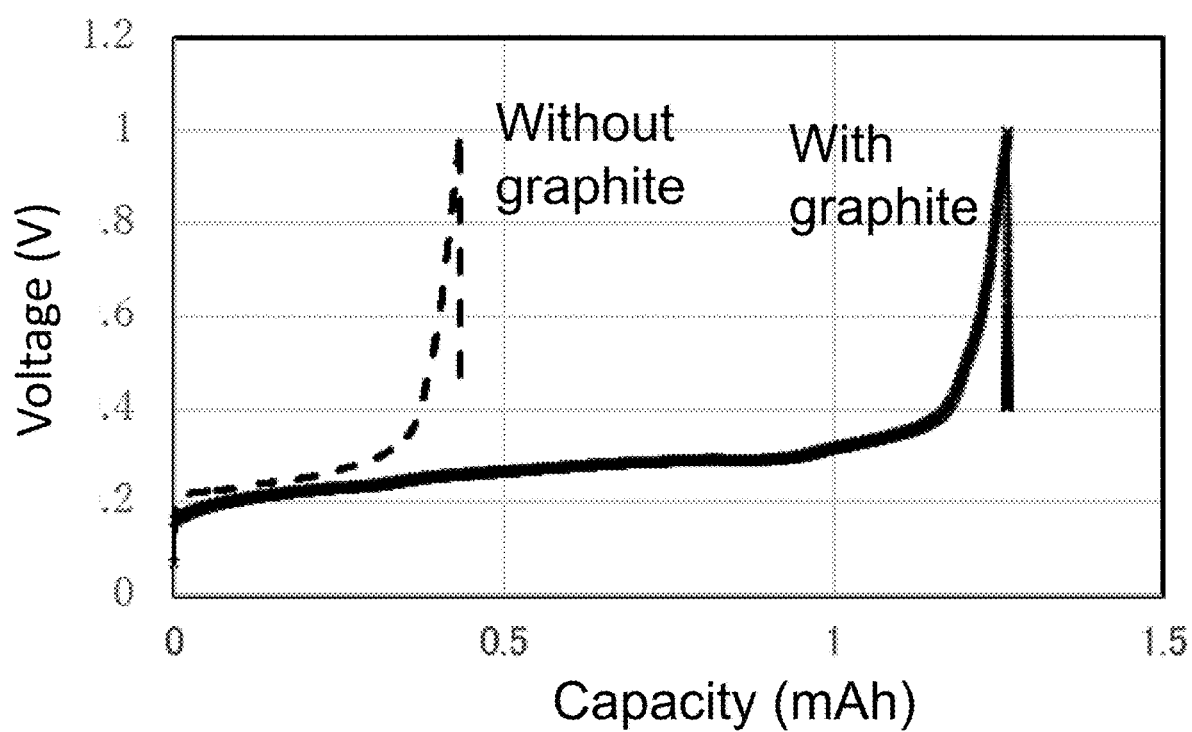
FIG. 3D is a graph showing discharge curves of cells of the measurement example 3 and the measurement example 4.

FIG. 3D is a graph showing the discharge curves of the cells of the measurement example 3 and the measurement example 4. In FIG. 3D, the solid line indicates the discharge curve of the cell of the measurement example 3. The broken line indicates the discharge curve of the cell of the measurement example 4. As can be seen from FIG. 3D, the cell of measurement example 3 had the same volume as and a higher discharge capacity than the cell of measurement example 4. In other words, the cell of measurement example 3 had a higher energy density than the cell of measurement example 4. From this, it is conceivable that, in the cell of the measurement example 3, biphenyl functioned as a discharge mediator and the graphite intercalation compound C$_6$Li was used for the discharge reaction.

Measurement Example for Aluminum

Measurement Example 5

First, an ether solution including biphenyl at a concentration of 0.1 mol/L was prepared. The solvent of the ether solution consisted of 2-methyltetrahydrofuran and triglyme. The ether solution included 1 mol/L of LiPF$_6$ as a supporting salt. The ratio of the volume of the triglyme to the volume of the solvent in the ether solution was 0.2. Next, 2×2 cm copper foil was wrapped with a polypropylene microporous separator. Next, the whole separator was wrapped with a large amount of lithium metal foil. Next, tabs were attached to the copper foil and the lithium metal foil. Next, the copper foil and the lithium metal foil were wrapped with a laminate outer package. An ether solution was injected into the laminate outer package. Immediately after the ether solution was injected, the laminate outer package was hermetically sealed by thermal fusion. In this way, the cell of the measurement example 5 was produced. In the cell of the measurement example 5, the lithium metal foil was in contact with the ether solution, and the lithium metal was dissolved in the ether solution.

Measurement Examples 6 to 13

The cells of the measurement examples 6 to 13 were produced in the same manner as in the measurement example 5, except that the ratio of the volume of the triglyme to the volume of the solvent in the ether solution was changed. In the cells of the measurement examples 6 to 13, the ratio of the volume of the triglyme to the volume of the solvent in the ether solution was 0.3, 0.4, 0.5, 0.6, 0.7, 0.8, 0.9, and 1.0, respectively.

Figure 4A:
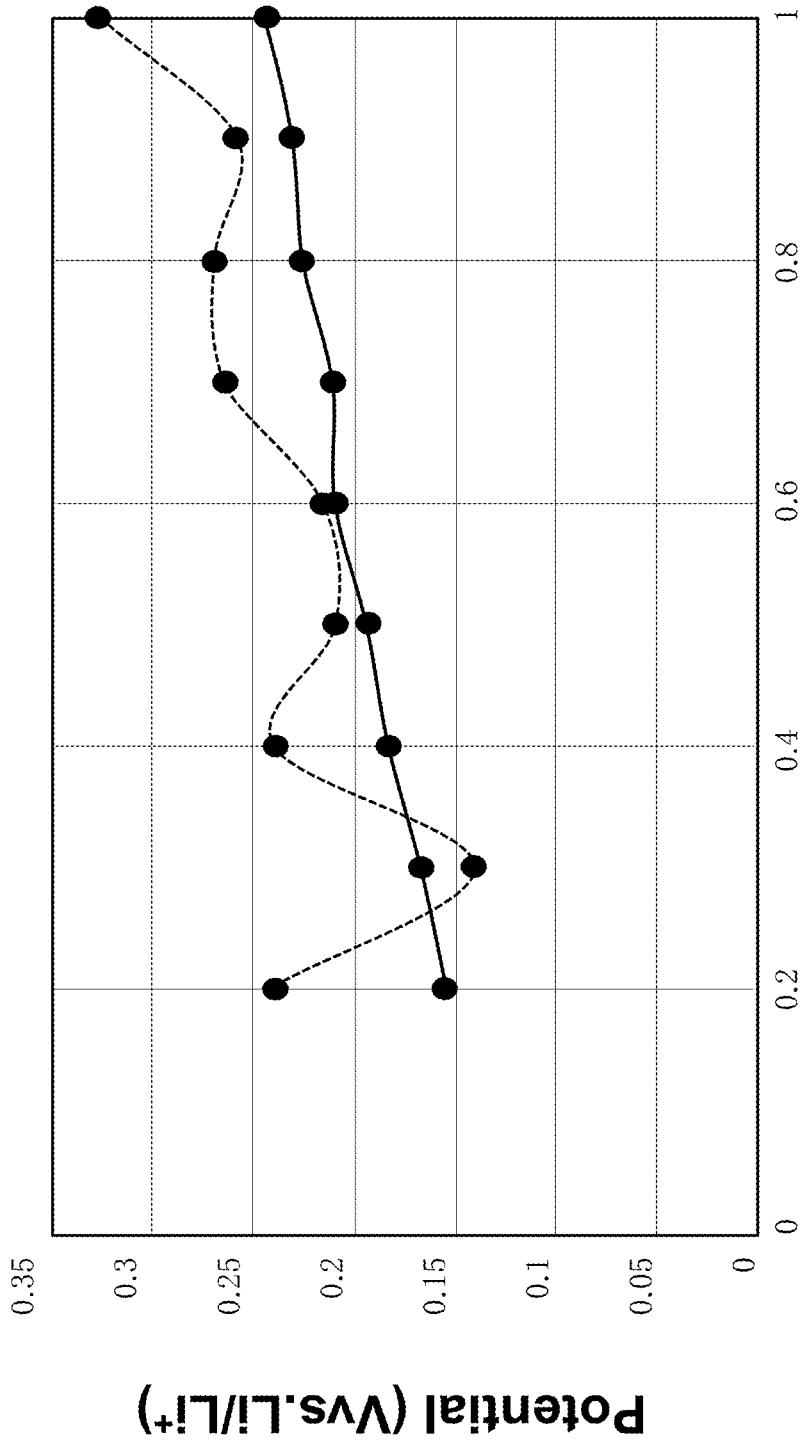
FIG. 4A is a graph showing a relationship between a ratio of a volume of triglyme to a volume of a solvent in an ether solution and a potential of the ether solution in cells of the measurement examples 5 to 13.

For each of the cells of the measurement examples 5 to 13, the potential of the ether solution was measured on the basis of lithium using the copper foil and the lithium metal foil. FIG. 4A is a graph showing the relationship between the ratio of the volume of the triglyme to the volume of the solvent in the ether solution and the potential of the ether solution in the cells of the measurement examples 5 to 13. In FIG. 4A, the broken line indicates a value of the potential immediately after the cell was produced. The solid line indicates the value of the potential after 100 hours elapsed from the production of the cell. Immediately after the cell was produced, a sufficient amount of the lithium metal was not dissolved in the ether solution, and the value of the potential was not stable. On the other hand, after 100 hours elapsed from the production of the cell, an excessive amount of the lithium metal was dissolved in the ether solution, and the value of the potential was stable. Therefore, the value of the potential of the ether solution 100 hours after the cell is produced can be regarded as the equilibrium potential of the ether solution saturated with lithium.

Next, aluminum was added as an active material to the ether solutions in the cells of the measurement examples 5 to 13. The surface of the active material was observed 100 hours after the active material was added. As a result, it was observed that the active material added to the cells of the measurement examples 5 and 6 was turned into a LiAl alloy. In the cells of the measurement examples 5 and 6, the active material was powdery. Only the surface of the active material added to the cell of the measurement example 7 was rough, and a part thereof was turned into the LiAl alloy. In the cell of the measurement example 7, the shape of the active material when the active material was added to the ether solution was maintained. Any changes of the active materials added to the cells of the measurement examples 8 to 13 were not observed, and no LiAl alloy was formed. As described above, in the cells of the measurement examples 5 to 7 in which the equilibrium potential of the ether solution was not more than 0.18 V vs. Li/Li$^+$, biphenyl functioned as a charge mediator, and aluminum was used for the charge reaction. On the other hand, in the cells of the measurement examples 8 to 13 in which the equilibrium potential of the ether solution was more than 0.18 V vs. Li/Li$^+$, the charge reaction did not proceed. From the above results, it can be seen that the charge reaction of the flow battery proceeds, in a case where the anode active material of the flow battery includes aluminum and where the equilibrium potential of the first liquid of the flow battery is not more than 0.18 V vs. Li/Li$^+$.

Measurement Example 14

The cell of the measurement example 14 was produced in the same manner as the measurement example 2, except that an ether solution including a mixture of 2-methyltetrahydrofuran and triglyme as a solvent was used in place of the 2-methyltetrahydrofuran solution A, and that aluminum foil which was cut into 3×6 mm square and had a thickness of 18 μm was used. The ratio of the volume of the triglyme to the volume of the solvent in the ether solution was 0.3. If the ether solution of the measurement example 14 is saturated with lithium, the equilibrium potential of the ether solution is not more than 0.18 V vs. Li/Li$^+$, similarly to the case of the ether solution of the measurement example 6.

Figure 4B:
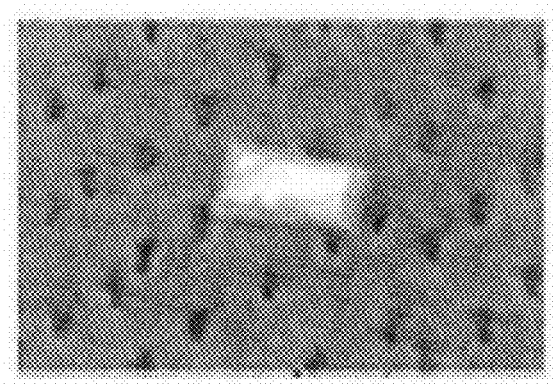
FIG. 4B is an image of the active material before the active material is added to a cell of the measurement example 14.
Figure 4C:
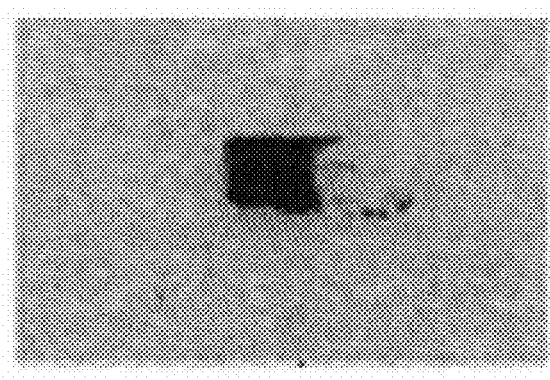
FIG. 4C is an image of the active material after a voltage was applied to the cell of the measurement example 14.

Next, a voltage was applied to the cell of the measurement example 14. FIG. 4B is an image of the active material before the active material is added to the cell of the measurement example 14. FIG. 4C is an image of the active material after the voltage was applied to the cell of the measurement example 14. As can be seen from FIGS. 4B and 4C, the application of the voltage to the cell of the measurement example 14 changed the color of the active material to black. From this, it is conceivable that aluminum was reduced by lithium biphenyl and a LiAl alloy was formed. Next, the discharge curve was provided by discharging the cell of the measurement example 14 after the voltage was applied.

Measurement Example 15

The cell of the measurement example 15 was produced in the same manner as the measurement example 14, except that the aluminum foil was not added to the container. Next, a voltage was applied to the cell of the measurement example 15. A discharge curve was provided by discharging the cell of the measurement example 15 after the voltage was applied.

Figure 4D:
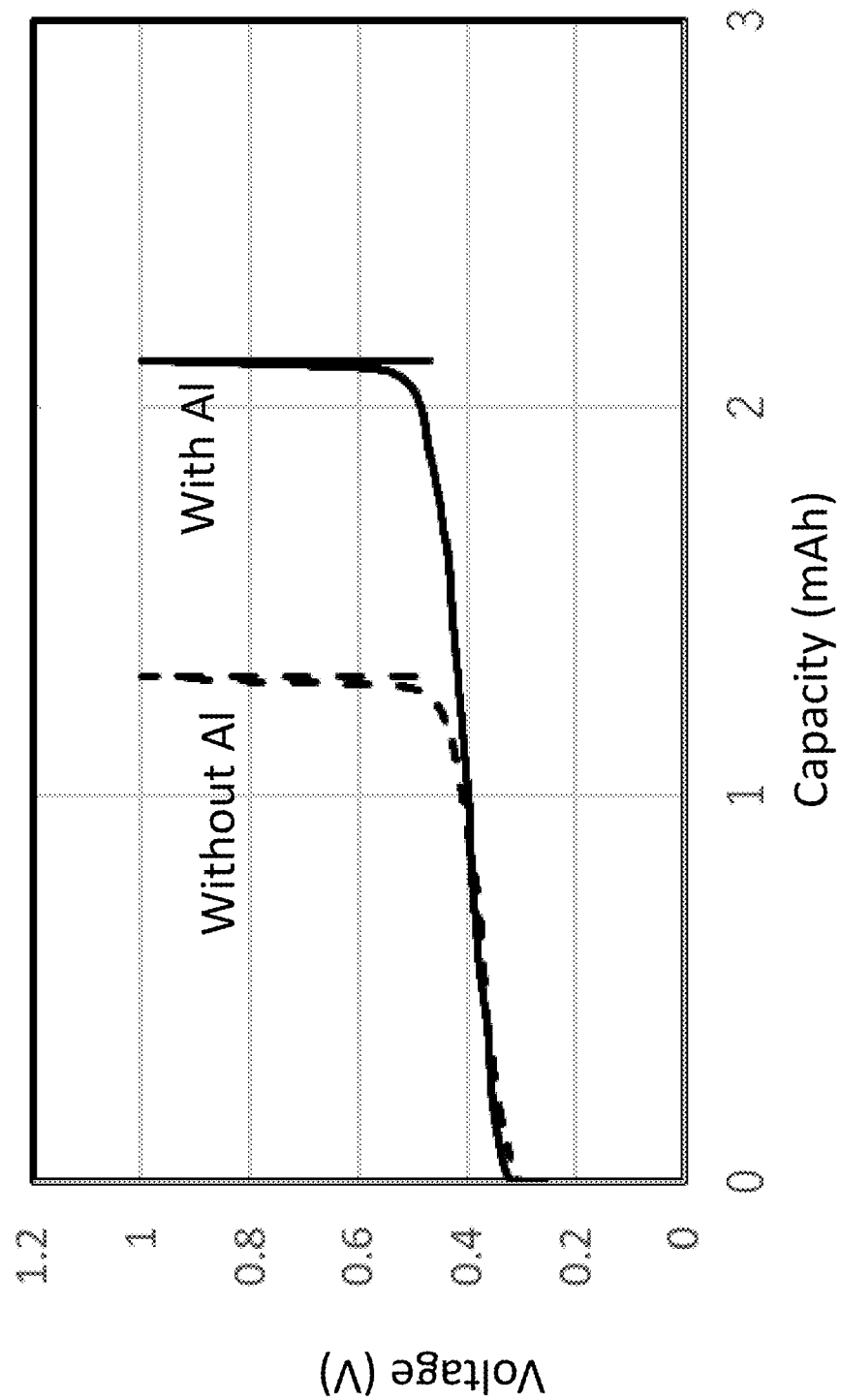
FIG. 4D is a graph showing discharge curves of the cell of the measurement example 14 and a cell of the measurement example 15.

FIG. 4D is a graph showing the discharge curves of the cells of the measurement examples 14 and 15. In FIG. 4D, the solid line indicates the discharge curve of the cell of the measurement example 14. The broken line shows the discharge curve of the cell of the measurement example 15. As can be seen from FIG. 4D, the cell of measurement example 14 had the same volume as and a higher discharge capacity than the cell of measurement example 15. Specifically, the discharge capacity of the cell of measurement example 14 was 0.8 mAh larger than that of the cell of measurement example 15. In other words, the cell of measurement example 14 had a higher energy density than the cell of measurement example 15. As described above, in the cell of the measurement example 14, it can be seen that biphenyl functioned as a charge mediator and a discharge mediator, and aluminum was used for the charge/discharge.

Measurement Example for Tin

Measurement Example 16

First, a triglyme solution including biphenyl at a concentration of 0.00625 mol/L was prepared. The triglyme solution included 1 mol/L of LiPF$_6$ as a supporting salt. Next, 2×2 cm copper foil was wrapped with a polypropylene microporous separator. Next, the whole separator was wrapped with a large amount of lithium metal foil. Next, tabs were attached to the copper foil and the lithium metal foil. Next, the copper foil and the lithium metal foil were wrapped with a laminate outer package. The triglyme solution was injected into the laminate outer package. Immediately after the triglyme solution was injected, the cell of the measurement example 16 was produced by sealing the laminate outer package hermetically by thermal fusion. In the cell of the measurement example 16, the lithium metal foil was in contact with the triglyme solution, and the lithium metal was dissolved in the triglyme solution.

Measurement Examples 17 to 22

The cells of the measurement examples 17 to 22 were produced in the same manner as in the measurement example 16, except that the concentration of the biphenyl in the triglyme solution was changed to the values shown in Table 5.

For the cell of the measurement examples 16 to 22, the potential of the triglyme solution was measured on the basis of lithium using the copper foil and the lithium metal foil. Table 5 shows the value of the potential immediately after the cell was produced, the value of the potential 20 hours after the cell was produced, and the value of the potential 100 hours after the cell was produced. Immediately after the cell was produced and 20 hours after the cell was produced, a sufficient amount of the lithium metal was not dissolved in the triglyme solution, and the value of the potential was not stable. On the other hand, after 100 hours elapsed from the production of the cell, an excessive amount of the lithium metal was dissolved in the triglyme solution, and the value of the potential was stable. Therefore, the value of the potential of the triglyme solution after 100 hours elapsed from the production of the cell can be regarded as the equilibrium potential of the triglyme solution saturated with lithium.

TABLE 5

|  | M.E. 16 | M.E. 17 | M.E. 18 | M.E. 19 | M.E. 20 | M.E. 21 | M.E. 22 |
|---|---|---|---|---|---|---|---|
| Biphenyl concentration (mol/L) | 0.00625 | 0.0125 | 0.025 | 0.05 | 0.1 | 0.5 | 1 |
| 0 hours later OCV (V vs. Li/Li$^+$) | 2.016 | 1.735 | 1.108 | 0.39 | 0.34 | 0.27 | 0.25 |
| 20 hours later OCV (V vs. Li/Li$^+$) | 0.319 | 0.298 | 0.255 | 0.246 | 0.231 | 0.242 | 0.241 |
| 100 hours later OCV (V vs. Li/Li$^+$) | 0.28 | 0.262 | 0.25 | 0.246 | 0.238 | 0.239 | 0.245 |

M.E. means Measurement Example.

Next, tin was added as an active material to the triglyme solutions in the cells of the measurement examples 16 to 22. The surface of the active material was observed 100 hours after the active material was added. As a result, it was observed that the active materials added to the cells of the measurement examples 18 to 22 were turned into a LiSn alloy. As described above, in the cells of the measurement examples 18 to 22 in which the equilibrium potential of the triglyme solution was not more than 0.25 V vs. Li/Li$^+$, biphenyl functioned as a charge mediator and tin was used for the charge reaction. On the other hand, in the cells of the measurement examples 16 and 17 in which the equilibrium potential of the triglyme solution was more than 0.25 V vs. Li/Li$^+$, the charge reaction did not proceed. From the above results, it can be seen that the charge reaction of the flow battery proceeds in a case where the anode active material of the flow battery includes tin and where the equilibrium potential of the first liquid of the flow battery is not more than 0.25 V vs. Li/Li$^+$.

Measurement Example for Silicon

Measurement Example 23

The cell of the measurement example 23 was produced in the same manner as in the measurement example 1, except that a carbonate ester solution including a mixture of ethylene carbonate (EC) and ethyl methyl carbonate (EMC) was used as a solvent in place of the 2-methyltetrahydrofuran solution, and that the graphite electrode was changed to a 21 mm square silicon electrode. In the carbonate ester solution, the volume ratio between EC and EMC was 1:3.

Figure 5A:
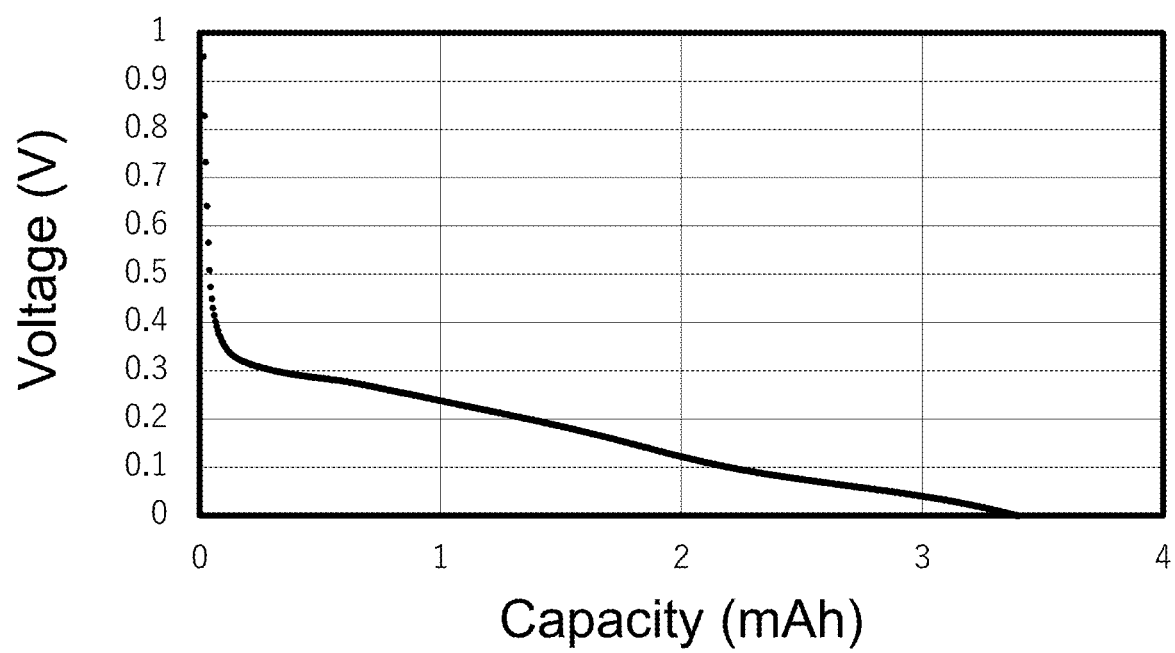
FIG. 5A is a graph showing a charge curve of a cell of the measurement example 23.

Next, the charge curve of the cell of the measurement example 23 was provided in the same manner as the measurement example 1, except that the charge current was set to 0.068 mA/cm$^2$. FIG. 5A is a graph showing a charge curve of the cell of the measurement example 23. From the result of FIG. 5A, it can be seen that the charge reaction of the flow battery proceeds sufficiently in a case where the anode active material of the flow battery includes silicon and where the first liquid of the flow battery has an equilibrium potential of not more than 0.25 V vs Li/Li$^+$.

Measurement Example 24

First, a triglyme solution including biphenyl at a concentration of 1.0 mol/L was prepared. Next, 2×2 cm copper foil was wrapped with a polypropylene microporous separator. Next, the whole separator was wrapped with a large amount of lithium metal foil. Next, tabs were attached to the copper foil and the lithium metal foil. Next, the copper foil and the lithium metal foil were wrapped with a laminate outer package. The triglyme solution was injected into the laminate outer package. Immediately after the triglyme solution was injected, the laminate outer package was sealed hermetically by thermal fusion to produce the cell of the measurement example 24. In the cell of the measurement example 24, the lithium metal foil was in contact with the triglyme solution, and the lithium metal was dissolved in the ether solution. For the cell of the measurement example 24, the potential of the triglyme solution was measured on the basis of lithium using the copper foil and the lithium metal foil. In the cell of the measurement example 24, the equilibrium potential of the triglyme solution saturated with lithium was 0.313 V vs. Li/Li$^+$.

Next, 1.1 mg of a silicon piece was added as an active material to 0.5 mL of the triglyme solution in the cell of the measurement example 24. The silicon piece was wrapped in a nonwoven fabric. After 25 hours elapsed from the addition of the active material, the active material was taken out of the triglyme solution. This active material was immersed in ethanol; however, generation of hydrogen was not observed. The shape of the silicon piece did not change before and after the silicon piece was added to the triglyme solution. As described above, in the cell of the measurement example 24 in which the equilibrium potential of the triglyme solution is more than 0.25 V vs. Li/Li$^+$, the charge reaction did not proceed.

Measurement Example 25

The cell of the measurement example 25 was produced in the same manner as the measurement example 2, except that silicon was used as the active material. The silicon was disposed on the copper foil cut into 3×5 mm square. The laminate of the silicon and the copper foil was produced by depositing the silicon on the copper foil by sputtering.

Next, a voltage was applied to the cell of the measurement example 25 through the foamed stainless steel and the lithium metal. By applying the voltage to the cell of the measurement example 25, the 2-methyltetrahydrofuran solution was colored, similarly to the case of FIG. 3B. From this, it is conceivable that, in the 2-methyltetrahydrofuran solution, lithium biphenyl was produced by reducing biphenyl on the surface of the foamed stainless steel. Next, the active material was taken out from the cell of the measurement example 25 after the voltage was applied. The active material was immersed in methanol, and hydrogen was generated. From this, it is conceivable that silicon was reduced by lithium biphenyl and a LiSi alloy was formed. As described above, in the cell of the measurement example 25, it can be seen that biphenyl functioned as a charge mediator and silicon was used for the charge reaction. Therefore, it is conceivable that, in the cell of the measurement example 25 to which voltage was applied, the equilibrium potential of the 2-methyltetrahydrofuran solution was not more than 0.25 V vs. Li/Li$^+$.

Measurement Example 26

The cell of the measurement example 26 was produced in the same manner as the measurement example 25, except that an excessive amount of the lithium metal was immersed in the 2-methyltetrahydrofuran solution A, the 2-methyltetrahydrofuran solution A was saturated with lithium, and that a LiSi alloy was added to the container in place of silicon. A discharge curve was provided by discharging the cell of the measurement example 26.

Measurement Example 27

The cell of the measurement example 27 was produced in the same manner as the measurement example 26, except that the LiSi alloy was not added to the container. A discharge curve was provided by discharging the cell of the measurement example 27.

Figure 5B:
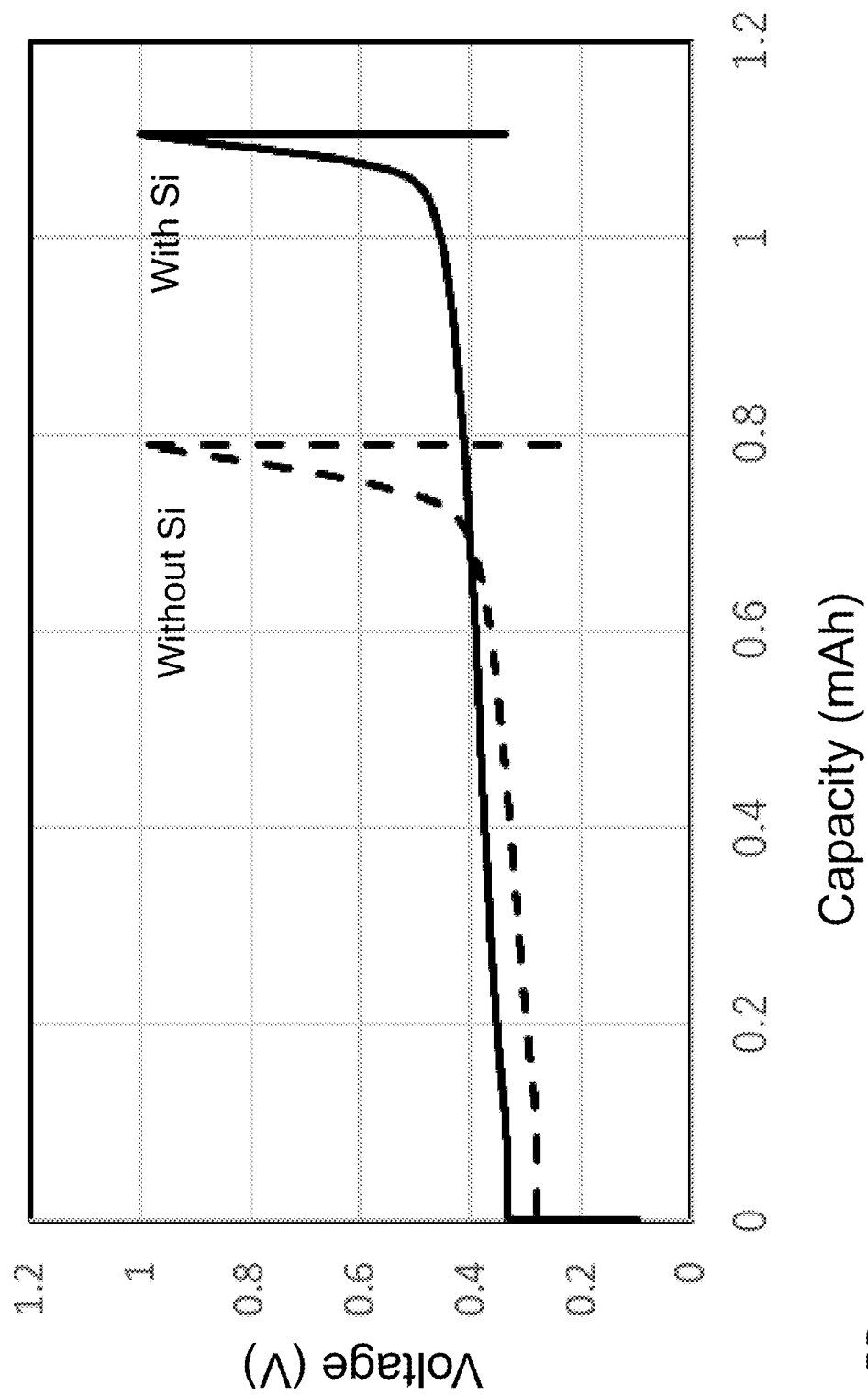
FIG. 5B is a graph showing discharge curves of cells of the measurement example 26 and the measurement example 27.

FIG. 5B is a graph showing the discharge curves of the cells of the measurement example 26 and the measurement example 27. In FIG. 5B, the solid line indicates the discharge curve of the cell of the measurement example 26. The broken line indicates the discharge curve of the cell of the measurement example 27. As can be seen from FIG. 5B, the cell of measurement example 26 had the same volume as and a higher discharge capacity than the cell of measurement example 27. In other words, the cell of measurement example 26 had a higher energy density than the cell of measurement example 27. From this, it is conceivable that, in the cell of the measurement example 26, biphenyl functioned as a discharge mediator and the LiSi alloy was used for the discharge reaction.

Measurement Example for Anode Mediator and Undesired Compound

Measurement Example 28

First, a 2-methyltetrahydrofuran solution A in which 0.1 mol/L of biphenyl and 1 mol/L of $LiPF_6$ were dissolved was prepared. An excessive amount of the lithium metal was immersed in the 2-methyltetrahydrofuran solution A to saturate the 2-methyltetrahydrofuran solution A with lithium. Next, a 2-methyltetrahydrofuran solution B in which 1 mol/L $LiPF_6$ was dissolved and no biphenyl was included was prepared. Next, a container in which the inside thereof was partitioned with LLZ was prepared. In the container, foamed stainless steel was disposed as a current collector in one space partitioned by LLZ. In the container, a lithium metal was placed in the other space partitioned by LLZ. Next, 1 mL of the 2-methyltetrahydrofuran solution A was added to the one space. The 2-methyltetrahydrofuran solution B was added to the other space. Thereby, the cell of the measurement example 28 was provided. A discharge curve was provided by discharging the cell of the measurement example 28.

Measurement Example 29

The cell of the measurement example 29 was produced in the same manner as in the measurement example 28, except that trans-stilbene was used in place of biphenyl. As shown in Table 3, trans-stilbene is an undesired compound having an equilibrium potential of 0.3 V vs. $Li/Li^+$ when the potential measurement test B is performed. A discharge curve was provided by discharging the cell of the measurement example 29.

Figure 6:
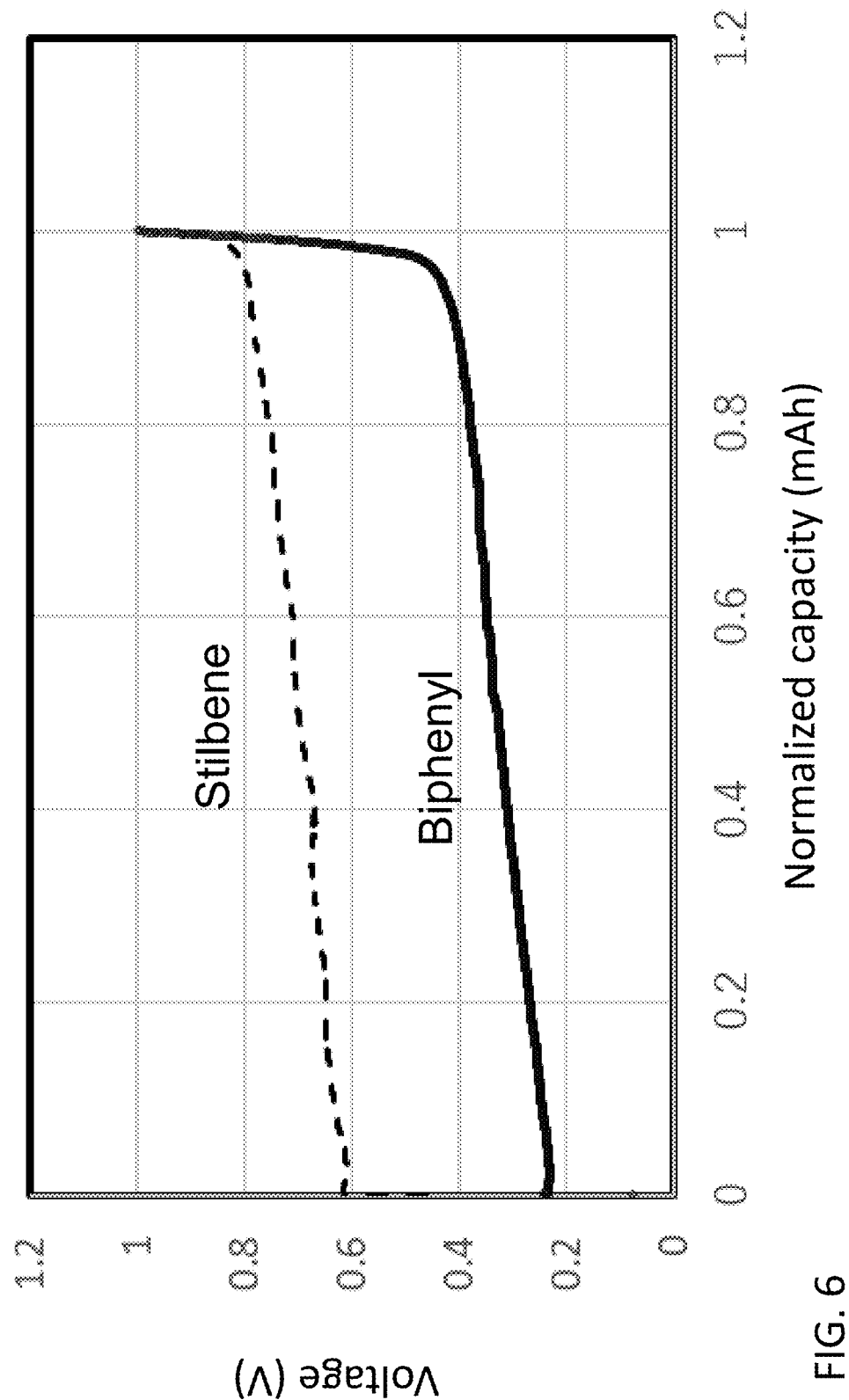
FIG. 6 is a graph showing discharge curves of cells of the measurement example 28 and the measurement example 29.

FIG. 6 is a graph showing the discharge curves of the cells of the measurement example 28 and the measurement example 29. In FIG. 6, the solid line indicates the discharge curve of the cell of the measurement example 28. The broken line indicates the discharge curve of the cell of the measurement example 29. As can be seen from FIG. 6, the discharge voltage of the cell of the measurement example 29 is approximately 380 mV higher than the discharge voltage of the cell of the measurement example 28. This result reveals that the oxidation potential of trans-stilbene is approximately 380 mV higher than the oxidation potential of biphenyl.

In the flow battery A including both biphenyl and trans-stilbene as an anode mediator, trans-stilbene, which has a high oxidation potential, functions as a discharge mediator. Therefore, the discharge voltage of the flow battery A is determined depending on the discharge potential difference between the cathode mediator and trans-stilbene, which functions as a discharge mediator in the anode. On the other hand, in the flow battery B including only biphenyl as the anode mediator, biphenyl also functions as a discharge mediator. Therefore, the discharge voltage of the flow battery B is determined depending on the discharge potential difference between the cathode mediator and biphenyl, which functions as a discharge mediator in the anode. The flow battery B has a higher discharge voltage by approximately 380 mV than the flow battery A, and has a high energy density. Therefore, a decrease in electric power efficiency in charge/discharge is suppressed in the flow battery B, compared to the flow battery A.

As described above, in the measurement examples 1 to 29, evaluation for predicting the performance of the flow battery of the present embodiment was performed. The present inventors have confirmed that the knowledge provided based on the measurement examples 1 to 29 can be applied to the flow battery.

INDUSTRIAL APPLICABILITY

The flow battery of the present disclosure can be used as an electrical storage device or an electrical storage system, for example.

REFERENCE SIGNS LIST

10 Anode
12 First liquid
14 Anode active material
16 Anode terminal
18 Anode mediator
20 Cathode
22 Second liquid
24 Cathode active material
26 Cathode terminal
28 Cathode mediator
30 Lithium ion conductive film
40 First circulation mechanism
41 First storage part
42 First filter
43, 44 Pipe
45 Pump
50 Second circulation mechanism
51 Second storage part
52 Second filter
53, 54 Pipe
55 Pump
61 Anode chamber
62 Cathode chamber
100 Flow battery

The invention claimed is:

1. A flow battery, comprising:
an anode;
a cathode;
a first liquid which includes an anode mediator and lithium ions and is in contact with the anode;
an anode active material which is in contact with the first liquid;
a second liquid which is in contact with the cathode; and
a lithium ion conductive film disposed between the first liquid and the second liquid, wherein:
the anode active material includes graphite,
the first liquid includes 2-methyltetrahydrofuran,
a graphite intercalation compound is generated during charge,
and the graphite intercalation compound contains $C_6Li$, wherein
the anode mediator includes at least one selected from the group consisting of phenanthrene, biphenyl, o-terphenyl, triphenylene, anthracene, acenaphthene, acenaphthylene fluoranthene, and benzil.

2. The flow battery according to claim 1, further comprising:
a first circulation mechanism for circulating the first liquid between the anode and the anode active material.

3. The flow battery according to claim 1, further comprising:
a cathode active material which is in contact with the second liquid,
wherein
the second liquid includes a cathode mediator which is oxidized or reduced by the cathode and is oxidized or reduced by the cathode active material.

4. The flow battery according to claim 3, further comprising:
a second circulation mechanism for circulating the second liquid between the cathode and the cathode active material.

5. The flow battery according to claim 1, wherein
the anode active material is a solid.

* * * * *